United States Patent
Maeda

(10) Patent No.: US 10,707,963 B2
(45) Date of Patent: Jul. 7, 2020

(54) NETWORK DESIGN APPARATUS, NETWORK DESIGN METHOD, AND STORAGE MEDIUM

(71) Applicant: FUJITSU LIMITED, Kawasaki-shi, Kanagawa (JP)

(72) Inventor: Taizo Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/292,532

(22) Filed: Mar. 5, 2019

(65) Prior Publication Data
US 2019/0288775 A1  Sep. 19, 2019

(30) Foreign Application Priority Data

Mar. 13, 2018 (JP) ................................ 2018-045517

(51) Int. Cl.
| | | |
|---|---|---|
| H04B 10/08 | (2006.01) | |
| H04B 17/00 | (2015.01) | |
| H04B 10/27 | (2013.01) | |
| H04J 14/02 | (2006.01) | |
| H04Q 11/00 | (2006.01) | |

(52) U.S. Cl.
CPC .......... *H04B 10/27* (2013.01); *H04J 14/0212* (2013.01); *H04Q 11/0062* (2013.01); *H04Q 2011/0084* (2013.01)

(58) Field of Classification Search
CPC ..................................................... H04B 10/27
See application file for complete search history.

(56) References Cited

U.S. PATENT DOCUMENTS

| | | | | |
|---|---|---|---|---|
| 2010/0027988 A1* | 2/2010 | Hoshida | ............... | H04J 14/0227 398/1 |
| 2011/0135301 A1* | 6/2011 | Myslinski | ............ | H04B 10/572 398/34 |
| 2012/0213522 A1* | 8/2012 | Zhang | .................. | H04B 10/541 398/82 |
| 2015/0139652 A1* | 5/2015 | Bottari | ................ | H04J 14/0256 398/79 |
| 2015/0162980 A1* | 6/2015 | Cavaliere | ......... | H04B 10/07953 398/26 |
| 2016/0050470 A1* | 2/2016 | Swinkels | ........... | H04Q 11/0062 398/45 |

FOREIGN PATENT DOCUMENTS

| | | |
|---|---|---|
| JP | 2005-64905 | 3/2005 |
| JP | 2010-41108 | 2/2010 |

* cited by examiner

*Primary Examiner* — David C Payne
*Assistant Examiner* — Pranesh K Barua
(74) *Attorney, Agent, or Firm* — Fujitsu Patent Center

(57) ABSTRACT

A network design method includes calculating, from the number of wavelength filters on a transmission route of an optical signal, a bandwidth of the optical signal after narrowing by the wavelength filters, selecting, from a plurality of combinations of a multi-level modulation system and a baud rate about the optical signal set in a transmitting apparatus, one or more first combinations about which a lower-limit value of the bandwidth of the optical signal in each of the combinations is equal to or smaller than the bandwidth of the optical signal after narrowing, and selecting a second combination from the one or more first combinations based on a minimum value of an OSRN of the optical signal in the selected combinations.

8 Claims, 14 Drawing Sheets

| OPERATION MODE NUMBER | MODE PARAMETER | | | MULTI-LEVEL DEGREE | BAUD RATE [Gbaud] | BAND LIMIT VALUE (Bo) [GHz] | PENALTY [dB] | OSNR TOLERANCE [dB] |
|---|---|---|---|---|---|---|---|---|
| | MULTI-LEVEL MODULATION SYSTEM | LINE RATE [Gbps] | FEC REDUDANCY [%] | | | | | |
| #1 | DP-QPSK | 200 | 20 | 2 | 64 | 61 | 1.0 | 15 |
| #2 | DP-8QAM | 200 | 20 | 3 | 46 | 46 | 1.2 | 20 |
| #3 | DP-16QAM | 200 | 20 | 4 | 30 | 30 | 1.4 | 25 |
| #4 | DP-QPSK | 200 | 15 | 2 | 59 | 56 | 1.1 | 20 |
| #5 | DP-16QAM | 200 | 15 | 4 | 29 | 28 | 1.3 | 30 |
| #6 | DP-16QAM | 300 | 20 | 4 | 48 | 46 | 1.0 | 30 |
| #7 | DP-32QAM | 300 | 20 | 5 | 60 | 57 | 1.2 | 30 |

FIG. 7

| OPERATION MODE NUMBER | MODE PARAMETER | | | | BAUD RATE [Gbaud] | BAND LIMIT VALUE (Bo) [GHz] | PENALTY [dB] | OSNR TOLERANCE [dB] |
|---|---|---|---|---|---|---|---|---|
| | MULTI-LEVEL MODULATION SYSTEM | LINE RATE [Gbps] | FEC REDUDANCY [%] | MULTI-LEVEL DEGREE | | | | |
| #1 | DP-QPSK | 200 | 20 | 2 | 64 | 61 | 1.0 | 15 |
| #2 | DP-8QAM | 200 | 20 | 3 | 46 | 46 | 1.2 | 20 |
| #3 | DP-16QAM | 200 | 20 | 4 | 30 | 30 | 1.4 | 25 |
| #4 | DP-QPSK | 200 | 15 | 2 | 59 | 56 | 1.1 | 20 |
| #5 | DP-16QAM | 200 | 15 | 4 | 29 | 28 | 1.3 | 30 |
| #6 | DP-16QAM | 300 | 20 | 4 | 48 | 46 | 1.0 | 30 |
| #7 | DP-32QAM | 300 | 20 | 5 | 60 | 57 | 1.2 | 30 |

NETWORK DESIGN APPARATUS, NETWORK DESIGN METHOD, AND STORAGE MEDIUM

CROSS-REFERENCE TO RELATED APPLICATION

This application is based upon and claims the benefit of priority of the prior Japanese Patent Application No. 2018-45517, filed on Mar. 13, 2018, the entire contents of which are incorporated herein by reference.

FIELD

The embodiments discussed herein are related to a network design apparatus and a network design method.

BACKGROUND

As a transmission system of a transmitting apparatus, there is a digital coherent optical transmission system, for example. In the digital coherent optical transmission system, a multi-level modulation system of an optical signal is set in a transmitting apparatus according to the transmission speed (line rate) of the optical signal if the baud rate is constant.

For example, assuming that the baud rate is approximately 32 (Gbaud), if the line rate is 100 (Gbps), dual polarization (DP)-quadrature phase shift keying (QPSK) is selected as the modulation system. If the line rate is 200 (Gbps), DP-16-quadrature amplitude modulation (QAM) is selected as the modulation system.

In recent years, due to improvement in the performance of digital signal processors (DSPs), analog-to-digital converters, and digital-to-analog converters, transmitting apparatuses that allow change in the baud rate in a range of 32 to 64 (Gbaud), for example, have been researched and developed. For this kind of transmitting apparatus, it is desired to select and set the optimum combination of the baud rate and the multi-level modulation system in terms of optical transmission characteristics. As a related art, a point that compensation operation of optical transmission characteristics is controlled by using the Q-factor is disclosed in Japanese Laid-open Patent Publication No. 2005-64905, for example.

When a multi-level degree of the multi-level modulation system is higher, the interval between symbols in the constellation of an optical signal becomes shorter. Thus, room for the phase and amplitude of the optical signal on the receiving side decreases, and optical signal-to-noise ratio (OSNR) tolerance deteriorates due to the influence of noise from an optical amplifier and so forth. To address this, the multi-level modulation system with a low multi-level degree may be selected so that the OSNR tolerance may become sufficient. However, as the multi-level degree becomes lower, the number of bits per symbol becomes smaller, and therefore it is desired to set a higher baud rate when implementation of a given line rate is intended.

However, as the baud rate becomes higher, the bandwidth (spectrum) of the optical signal becomes wider. Therefore, for example, the influence of pass band narrowing (PBN) due to a wavelength filter of a wavelength selective switch (WSS) on the transmission route of the optical signal increases. As above, a trade-off exists between the baud rate and the multi-level modulation system. Therefore, there is a problem that it is difficult for a person in charge of network design to manually select the optimum combination of the baud rate and the multi-level modulation system.

In view of the above, it is preferable to provide a network design apparatus and a network design method that allow proper network design in consideration of pass band narrowing and OSNR.

SUMMARY

According to an aspect of the embodiments, a network design method includes calculating, from the number of wavelength filters on a transmission route of an optical signal, a bandwidth of the optical signal after narrowing by the wavelength filters, selecting, from a plurality of combinations of a multi-level modulation system and a baud rate about the optical signal set in a transmitting apparatus, one or more first combinations about which a lower-limit value of the bandwidth of the optical signal in each of the combinations is equal to or smaller than the bandwidth of the optical signal after narrowing, and selecting a second combination from the one or more first combinations based on a minimum value of an OSRN of the optical signal in the selected combinations.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating one example of a communication setting database;

DESCRIPTION OF EMBODIMENTS

Figure 1:
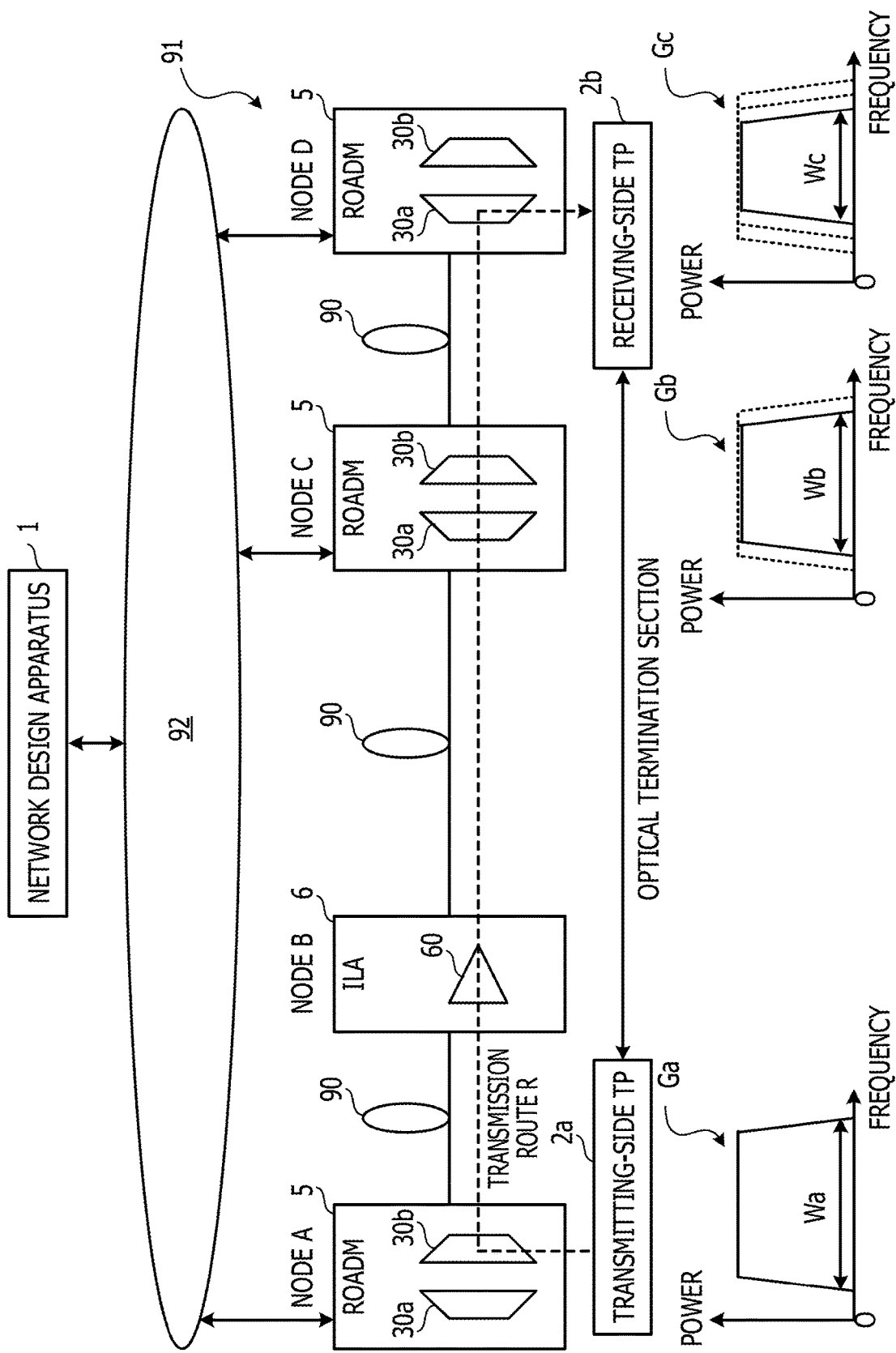
FIG. 1 is a configuration diagram illustrating one example of a wavelength division multiplex (WDM) network.

FIG. 1 is a configuration diagram illustrating one example of a (WDM) network. In a WDM network 91, nodes A to D coupled to each other by transmission paths (optical fibers) 90 are included. At nodes A, C, and D, ROADMs 5 are set in order to carry out wavelength multiplexing optical communication. At node B, an inline amplifier (ILA) 6 is set.

Each ROADM 5 is coupled to a network design apparatus 1 through a network 92 for control, such as a local area network (LAN). The network design apparatus 1 designs a transmission route R of an optical signal of the WDM network 91, and sets the multi-level modulation system, the FEC redundancy, and the baud rate of the optical signal for each ROADM 5.

In the present example, as represented by a dotted line, the optical signal is transmitted by a digital coherent optical transmission system along the transmission route R that goes through nodes A to D in that order. At node A as the starting point, a transmitting-side transponder (TP) 2a transmits the optical signal to the ROADM 5. At node D as the ending point, a receiving-side TP 2b receives the optical signal from the ROADM 5. Each ROADM 5 includes an input-side WSS 30a and an output-side wavelength selective switch 30b that cause the optical signal to be added and be dropped, and pass therethrough in units of wavelength.

The optical signal from the transmitting-side TP 2a is added by the output-side WSS 30b, and is input to the ILA 6 at node B. In the ILA 6, an erbium doped fiber amplifier (EDFA) 60 is set, for example. The optical signal passes through the EDFA 60, and is input to the ROADM 5 at node C. The optical signal passes through the input-side and output-side WSSs 30a and 30b in the ROADM 5 at node C, and is input to the ROADM 5 at node D. At node D, the optical signal is dropped by the input-side WSS 30a and is input to the receiving-side TP 2b.

In the description made hereinafter, a section in which the optical signal is transmitted without being converted to an electrical signal will be represented as "optical termination section." In the present example, the optical termination section is the section from node A, at which the transmitting-side TP 2a exists, to node D, at which the receiving-side TP 2b exists.

In each of the input-side and output-side WSSs 30a and 30b, a wavelength filter in units of wavelength for extracting given wavelength light from a wavelength multiplexed optical signal into which plural beams of wavelength light are multiplexed is set. For this reason, the band of the optical signal is narrowed every time the optical signal passes through the input-side or output-side WSS 30a or 30b.

A symbol Ga represents one example of the spectrum waveform of the optical signal when the optical signal is output from the transmitting-side TP 2a at node A. The optical signal includes a bandwidth Wa according to the baud rate of the transmitting-side TP 2a.

A symbol Gb represents one example of the spectrum waveform of the optical signal when the optical signal is output from the ROADM 5 at node C. The band of the optical signal is narrowed through passing of the optical signal through the output-side WSS 30b at node A and the input-side and output-side WSSs 30a and 30b at node C. Thus, a bandwidth Wb of the optical signal is narrower than the bandwidth Wa of node A.

A symbol Gc represents one example of the spectrum waveform of the optical signal when the optical signal is output from the ROADM 5 at node D. The band of the optical signal is narrowed through further passing of the optical signal through the input-side WSS 30a at node D. Thus, a bandwidth Wc of the optical signal is narrower than the bandwidth Wb of node C. The bandwidth of the optical signal becomes wider when the baud rate thereof is higher, and therefore the influence of the narrowing also becomes larger.

The quality of the optical signal depends on narrowing of the band thereof and also on the OSNR in the receiving-side TP 2b. The OSNR changes according to the multi-level degree of the multi-level modulation system of the optical signal.

Figure 2:
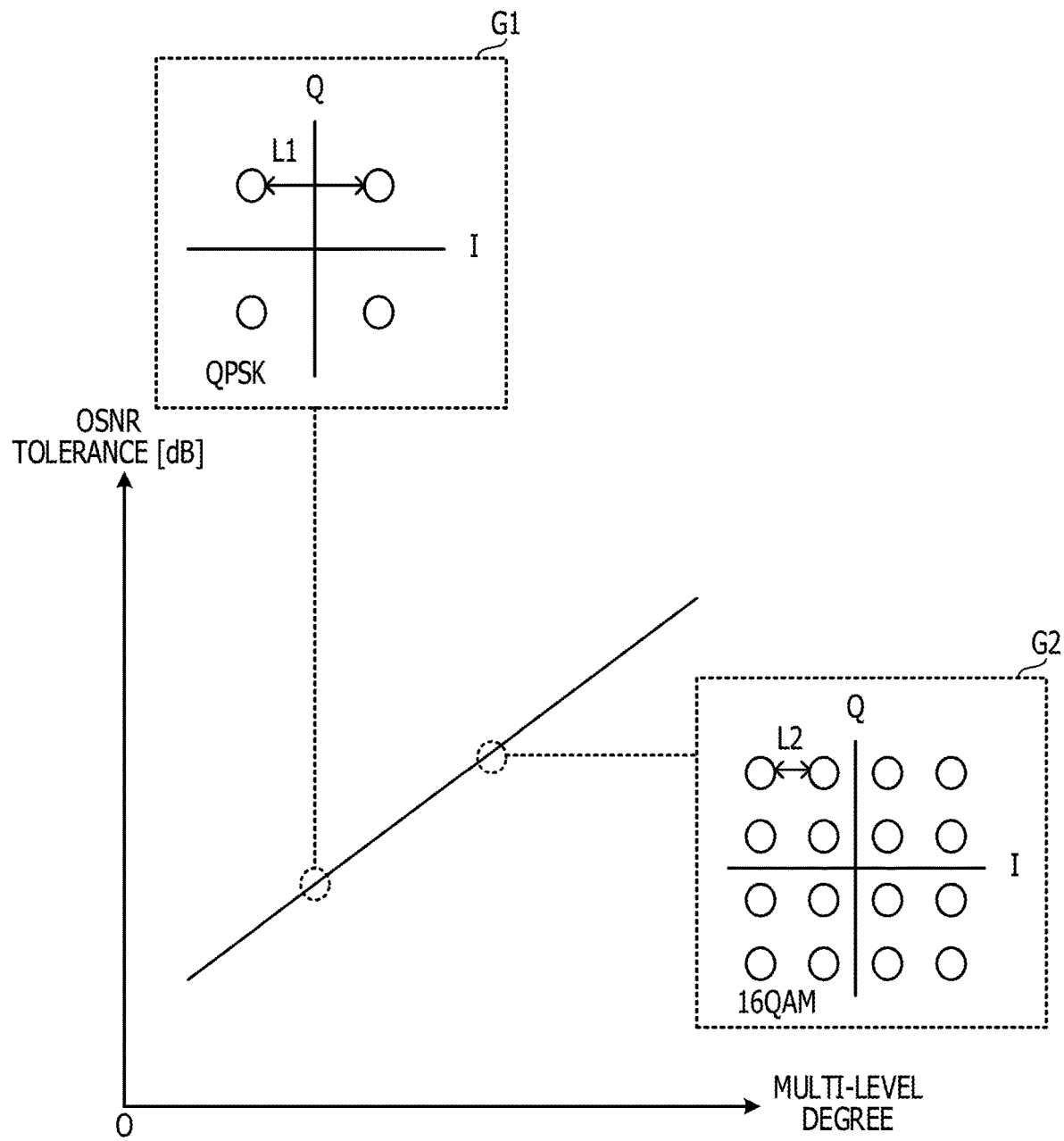
FIG. 2 is a diagram illustrating one example of change in OSNR tolerance with respect to a multi-level degree.

FIG. 2 is a diagram illustrating one example of change in an OSNR tolerance with respect to the multi-level degree. In FIG. 2, the abscissa axis represents the multi-level degree and the ordinate axis represents the OSNR tolerance (dB). The OSNR tolerance is the lower-limit value of the OSNR (for example, limit value of error correction) for causing the bit error rate of the optical signal to be 0 or lower. For this reason, the quality of the optical signal becomes higher when the OSNR tolerance is lower.

The OSNR tolerance increases (for example, deteriorates) when the multi-level degree is higher. This is because the OSNR tolerance becomes higher when the interval between symbols in the constellation of the optical signal is shorter.

A symbol G1 represents one example of the constellation of QPSK about which the multi-level degree is 2, and a symbol G2 represents one example of the constellation of 16-QAM about which the multi-level degree is 3. An interval L2 between symbols in the constellation of the 16-QAM is shorter than an interval L1 between symbols in the constellation of the QPSK. For this reason, the OSNR tolerance in the case of the 16-QAM is higher than the OSNR tolerance in the case of the QPSK.

As above, when the multi-level degree of the multi-level modulation system is higher, the interval between symbols in the constellation of an optical signal becomes shorter. Thus, room for the phase and amplitude of the optical signal on the receiving side decreases and the OSNR tolerance deteriorates due to the influence of noise from the ILA 6 and so forth. To address this, the multi-level modulation system with a low multi-level degree may be selected so that the OSNR tolerance may become sufficient. However, as the multi-level degree becomes lower, the number of bits per symbol becomes smaller, and therefore it is desired to set a higher baud rate when implementation of a given line rate is intended.

However, as the baud rate becomes higher, the bandwidth of the optical signal becomes wider as described above. Therefore, for example, the influence of pass band narrowing due to the wavelength filter of the WSSs 30a and 30b on the transmission route of the optical signal increases. As above, a trade-off exists between the baud rate and the multi-level modulation system. Therefore, there is a problem that it is difficult for a person in charge of network design to manually select the optimum combination of the baud rate and the multi-level modulation system.

Next, the configurations of the ROADM 5 and the TPs 2a and 2b will be described.

Figure 3:
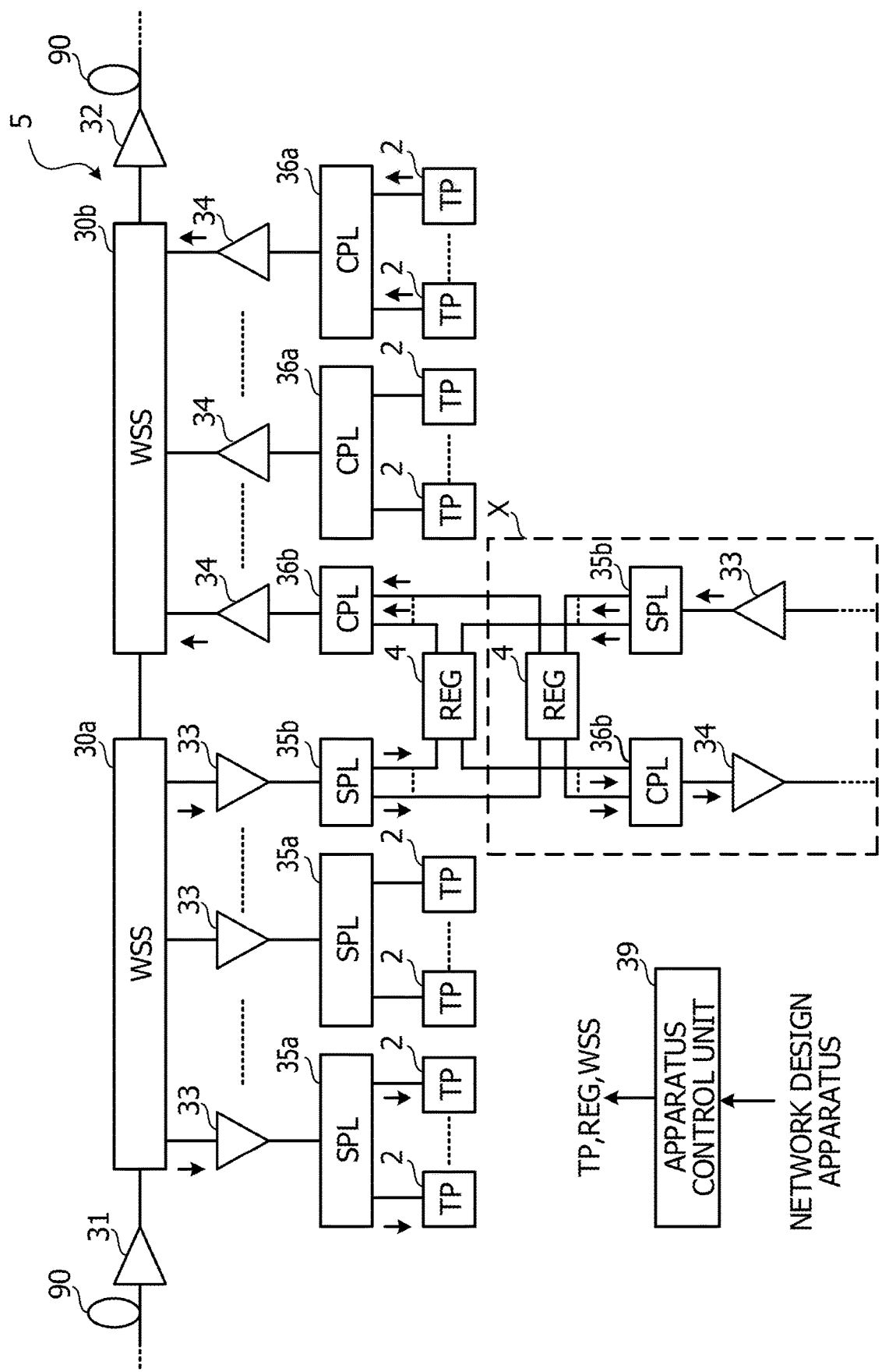
FIG. 3 is a configuration diagram illustrating one example of a reconfigurable optical add-and-drop multiplexer (ROADM)

FIG. 3 is a configuration diagram illustrating one example of an ROADM. The ROADM 5 includes the WSSs 30a and 30b, a preamplifier 31, a post amplifier 32, plural optical amplifiers 33 and 34, plural optical splitters (SPL) 35a and 35b, plural optical couplers (CPL) 36a and 36b, an apparatus control unit 39, and one or more REGs 4. In FIG. 3, a configuration corresponding to one set of input-side path and output-side path is described. A configuration in a frame represented by a symbol X corresponds to a path of another set.

The preamplifier 31 is coupled to an input port of the input-side WSS 30a, and the plural optical amplifiers 33 and the output-side WSS 30b are coupled to plural output ports of the input-side WSS 30a. The input-side WSS 30a and the plural optical amplifiers 34 are coupled to input ports of the output-side WSS 30b, and the post amplifier 32 is coupled to an output port of the output-side WSS 30b. The preamplifier 31 is coupled to the transmission path 90 on the input side, and the post amplifier 32 is coupled to the transmission path 90 on the output side.

Output ports of the optical amplifiers 33 are coupled to input ports of the SPLs 35a and 35b. Output ports of the SPL 35a are coupled to TPs 2. The TP 2 is a TP including both the transmitting-side TP 2a and the receiving-side TP 2b. The TP 2 coupled to the SPL 35a corresponds to the transmitting-side TP 2a.

Output ports of the CPLs 36a and 36b are coupled to input ports of the optical amplifiers 34. Input ports of the CPL 36a are coupled to the TPs 2. The TP 2 coupled to the CPL 36a corresponds to the receiving-side TP 2b.

Output ports of the SPL 35b and input ports of the CPL 36b are coupled to input ports of the respective REGs 4 each corresponding to a respective one of the set of the relevant path and the set of the other path. The REG 4 converts an optical signal input to the input port to an electrical signal and converts the electrical signal to the optical signal again to output the optical signal from an output port. Between the REG 4 of the set of the relevant path and the REG 4 of the set of the other path (REG 4 in the dotted line frame of the symbol X), partial input ports and output ports are coupled to each other. For this reason, the optical signal is output from the path of the input source to the path according to the destination.

The apparatus control unit 39 includes a central processing unit (CPU) circuit and so forth, for example, and controls operation of the ROADM 5. The apparatus control unit 39 carries out various kinds of setting for each TP 2, each REG 4, and the WSSs 30a and 30b in accordance with control from the network design apparatus 1. For example, the apparatus control unit 39 sets the wavelength of the optical signal of the dropping target for the input-side WSS 30a, each TP 2 coupled to the SPL 35a, and the REG 4 and sets the wavelength of the optical signal of the addition target for the output-side WSS 30b, each TP 2 coupled to the CPL 36a, and the REG 4.

A wavelength multiplexed optical signal input to the ROADM 5 is amplified by the preamplifier 31 and is input to the input-side WSS 30a. The input-side WSS 30a demultiplexes the wavelength multiplexed optical signal into optical signals in units of wavelength by the wavelength filter, outputs the optical signals of the dropping target to the optical amplifier 33, and combines the other optical signals to output the combined light to the output-side WSS 30b.

The output-side WSS 30b splits the combined light input from the input-side WSS 30a into optical signals in units of wavelength by the wavelength filter, and splits combined light of optical signals of the addition target input from the optical amplifiers 34 into optical signals in units of wavelength by the wavelength filter. The output-side WSS 30b generates a wavelength multiplexed optical signal by combining the respective optical signals and outputs it to the post amplifier 32. The post amplifier 32 amplifies the wavelength multiplexed optical signal and outputs it to the transmission path 90.

The optical amplifier 33 amplifies an optical signal and outputs the optical signal to the SPL 35a or 35b. The SPL 35a outputs the optical signal to the plural TPs 2 in a dropping manner. The TP 2 receives the optical signal with the already-set wavelength.

The CPL 36a combines optical signals input from the plural TPs 2, and outputs the combined light to the optical amplifier 34. The optical amplifier 34 amplifies the combined light and outputs the combined light to the output-side WSS 30b.

The SPL 35b drops an optical signal, and outputs the split optical signals to the REG 4 of the set of the relevant path and the REG 4 of the set of the other path. Each REG 4 outputs the optical signal to the CPL 36b of the set of the path according to the destination thereof in accordance with setting from the apparatus control unit 39. The respective optical signals input to the CPL 36b are combined to be output to the optical amplifier 34. The REG 4 terminates the optical signal and converts it to an electrical signal and converts the electrical signal to the optical signal again to output it. For this reason, the REG 4 corresponds to a boundary of an optical termination section.

According to the above-described configuration, when passing through the ROADM 5, the optical signal passes through the input-side WSS 30a and the output-side WSS 30b. When being dropped in the ROADM 5, the optical signal passes through the input-side WSS 30a. When being added in the ROADM 5, the optical signal passes through the output-side WSS 30b. Thus, the optical signal passes through two wavelength filters when being the passing target, and passes through one wavelength filter when being the dropping target or the addition target. The band of the optical signal is narrowed by a bandwidth according to the number of wavelength filters through which the optical signal passes.

Figure 4:
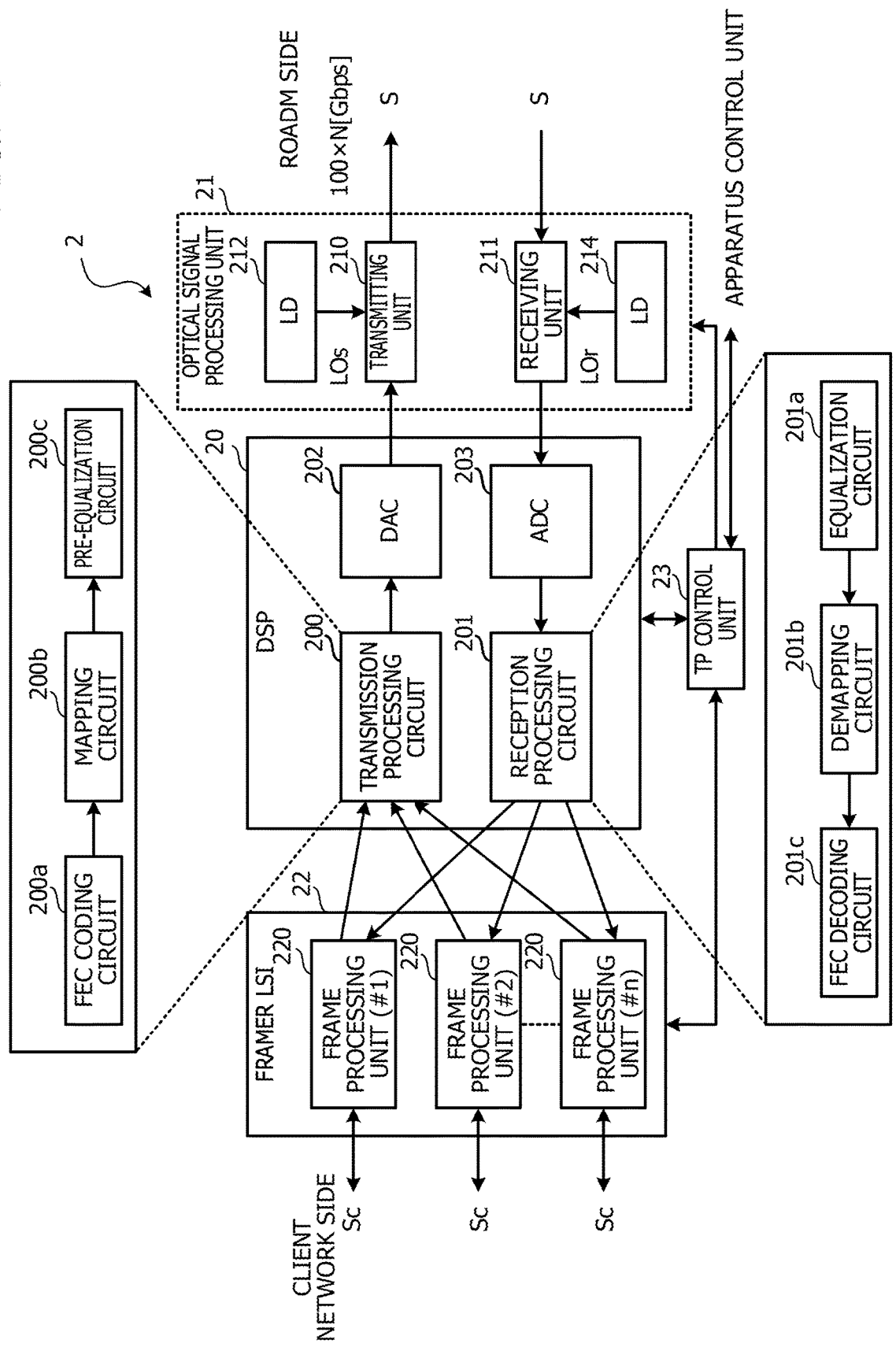
FIG. 4 is a configuration diagram illustrating one example of a transponder.

FIG. 4 is a configuration diagram illustrating one example of a TP. The TP 2 includes a DSP 20, an optical signal processing unit 21, a framer large scale integration (LSI) 22, and a TP control unit 23. The TP 2 is one example of a transmitting apparatus.

The optical signal processing unit 21 includes a transmitting unit 210, a receiving unit 211, and laser diodes (LDs) 212 and 214. The DSP 20 includes a transmission processing circuit 200, a reception processing circuit 201, a digital-to-analog converter (DAC) 202, and an analog-to-digital converter (ADC) 203. The transmission processing circuit 200 includes a forward error correction (FEC) encoding circuit 200a, a mapping circuit 200b, and a pre-equalization circuit 200c. The reception processing circuit 201 includes an equalization circuit 201a, a demapping circuit 201b, and an FEC decoding circuit 201c. The framer LSI 22 includes frame processing units (#1 to # n) (n: positive integer) 220.

Each frame processing unit 220 transmits and receives a client signal Sc with a client network. The client signal Sc is an Ethernet (registered trademark) signal, for example. The frame processing unit 220 receives the client signal Sc from the client network and converts the client signal Sc to an optical channel transport unit (OTU) frame to output it to the transmission processing circuit 200. The OTU frame is input from one or more frame processing units 220 to the transmission processing circuit 200.

The frame processing unit 220 receives the OTU frame from the reception processing circuit 201 and converts the OTU frame to the client signal Sc to transmit it to the client network. The reception processing circuit 201 outputs the OTU frame to one or more frame processing units 220.

The OTU frame is prescribed in International Telecommunication Union Telecommunication Standardization Sector (ITU-T) Recommendation G.709. The frame format on the side of the WDM network 91 is not limited to the OTU frame.

The FEC encoding circuit 200a generates FEC as one example of an error correction code of the OTU frame and inserts the FEC in the OTU frame. The FEC encoding circuit 200a outputs the OTU frame to the mapping circuit 200b.

The mapping circuit 200b maps bit data of the OTU frame into symbols by executing modulation processing in accordance with a multi-level modulation system set from the TP control unit 23. At this time, the mapping circuit 200b executes the modulation processing at a baud rate set from the TP control unit 23. The mapping circuit 200b outputs a data signal obtained by the modulation processing to the pre-equalization circuit 200c.

The pre-equalization circuit 200c compensates for various kinds of loss caused in the transmission path 90 for the data signal in advance. For example, the pre-equalization circuit 200c carries out wavelength dispersion compensation, frequency offset compensation, input-output characteristic compensation of the DAC 202, and input-output characteristic compensation of the LD 212. The pre-equalization circuit 200c outputs the data signal to the DAC 202. The DAC 202 converts the data signal from the digital signal to an analog signal, and outputs the data signal to the transmitting unit 210.

The transmitting unit 210 includes optical modulator, polarization beam splitter, polarization beam combiner, and so forth. The transmitting unit 210 splits transmission light LOs input from the LD 212 into H-polarized wave, and V-polarized wave and optically modulates the H-polarized wave and the V-polarized wave by the data signal. The transmitting unit 210 generates an optical signal S by combining the modulated light beams of the H-polarized wave and the V-polarized wave, and outputs the optical signal S to the ROADM 5. Assuming that the transmission speed of the client signal is 100 (Gbps), if N (N: positive integer) client signals are accommodated in the optical signal S, the line rate of the optical signal S is 100×N (Gbps).

To the receiving unit 211, the optical signal S of the dropping target is input from the ROADM 5. The receiving unit 211 includes polarization beam splitter, optical-electrical converter, and so forth. The receiving unit 211 splits the optical signal S into the respective components of H-polarized wave and V-polarized wave, receives the optical signal S by local oscillation light LOr input from the LD 214, and converts the optical signal S to an electrical data signal to output it to the ADC 203. The ADC 203 converts the data signal from the analog signal to a digital signal, and outputs the data signal to the reception processing circuit 201.

The equalization circuit 201a compensates for loss caused in the transmission path 90 for the data signal. For example, the equalization circuit 201a carries out wavelength dispersion compensation, frequency offset compensation, polarization mode dispersion compensation, and carrier phase recovery. The equalization circuit 201a outputs the data signal to the demapping circuit 201b.

The demapping circuit 201b detects symbols by executing demapping processing of the data signal and converts the symbols to bit data. Thereby, the data signal is subjected to demodulation processing into the OTU frame. The demapping circuit 201b outputs the OTU frame to the FEC decoding circuit 201c.

The FEC decoding circuit 201c extracts FEC from the OTU frame and carries out data error correction. The FEC decoding circuit 201c outputs the OTU frame to the frame processing units 220.

The TP control unit 23 includes a CPU circuit, for example, and controls the DSP 20, the framer LSI 22, and the optical signal processing unit 21. The TP control unit 23 carries out various kinds of setting for the DSP 20, the framer LSI 22, and the optical signal processing unit 21 in accordance with control from the network design apparatus 1. For example, the TP control unit 23 sets the multi-level modulation system and the baud rate in the mapping circuit 200b and the demapping circuit 201b and sets the redundancy of FEC in the FEC encoding circuit 200a and the FEC decoding circuit 201c. The TP control unit 23 sets the line rate in the frame processing units 220.

In this manner, parameters that affect the pass band narrowing and the OSNR are set in the TP 2. The influence of the baud rate and the multi-level modulation system is as described above. The redundancy of FEC represents the ratio (%) of the FEC region inserted in the OTU frame. When the value thereof is larger, the error correction capability becomes higher, and thus the OSNR tolerance is improved. However, as the redundancy of FEC becomes higher, the baud rate is desired to be set higher, and thus the influence of the pass band narrowing also increases. Although the FEC is cited as the error correction system in the present example, another error correction system may be used.

Figure 5:
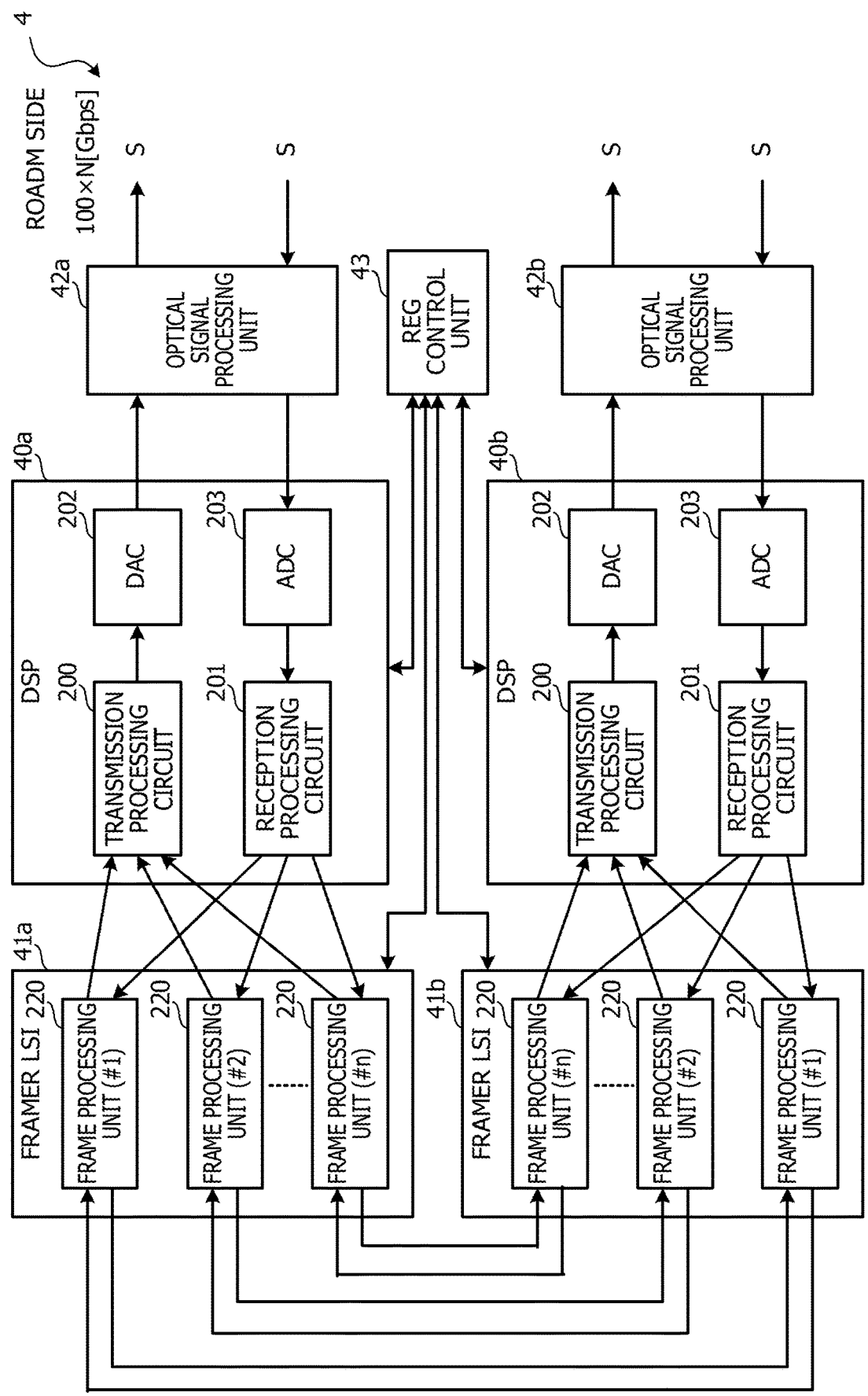
FIG. 5 is a configuration diagram illustrating one example of a regenerator (REG)

FIG. 5 is a configuration diagram illustrating one example of an REG. In FIG. 5, a configuration common to FIG. 4 is given the same symbol, and description thereof is omitted.

The REG 4 includes DSPs 40a and 40b, framer LSIs 41a and 41b, optical signal processing units 42a and 42b, and a REG control unit 43. The REG 4 includes a configuration obtained by coupling two TPs 2 between interfaces on the client network side.

The framer LSIs 41a and 41b each include plural frame processing units 220. The frame processing units 220 of the framer LSI 41a and the frame processing units 220 of the framer LSI 41b transmit and receive a client signal to and from each other. The DSPs 40a and 40b have the same configuration as the DSP 20 of the TP 2, and the optical signal processing units 42a and 42b include the same configuration as the optical signal processing unit 21 of the TP 2. The REG control unit 43 includes a CPU circuit, for example, and carries out the same setting as the TP control unit 23 for the frame processing units 220, the transmission processing circuit 200, and the reception processing circuit 201 in accordance with an instruction of the network design apparatus 1.

Based on the above-described configuration, the REG 4 may convert an optical signal input from a certain path to an electrical signal by one optical signal processing unit 42a or 42b and then convert the electrical signal to the optical signal again by the other optical signal processing unit 42a or 42b, and output the optical signal to another path. For this reason, if the REG 4 exists on the transmission path 90, the optical signal is temporarily terminated by the REG 4.

The network design apparatus 1 carries out design of the WDM network 91 including the TPs 2 and the ROADMs 5. For example, the network design apparatus 1 calculates the transmission route R of an optical signal and carries out proper setting in consideration of the pass band narrowing and the OSNR for the TPs 2. At this time, if determining that it is difficult for the optical signal to be transmitted through the transmission route R, the network design apparatus 1 divides the transmission route R into plural optical termination sections by disposing the REG 4 in the middle of the transmission route R. The network design apparatus 1 will be described below.

Figure 6:
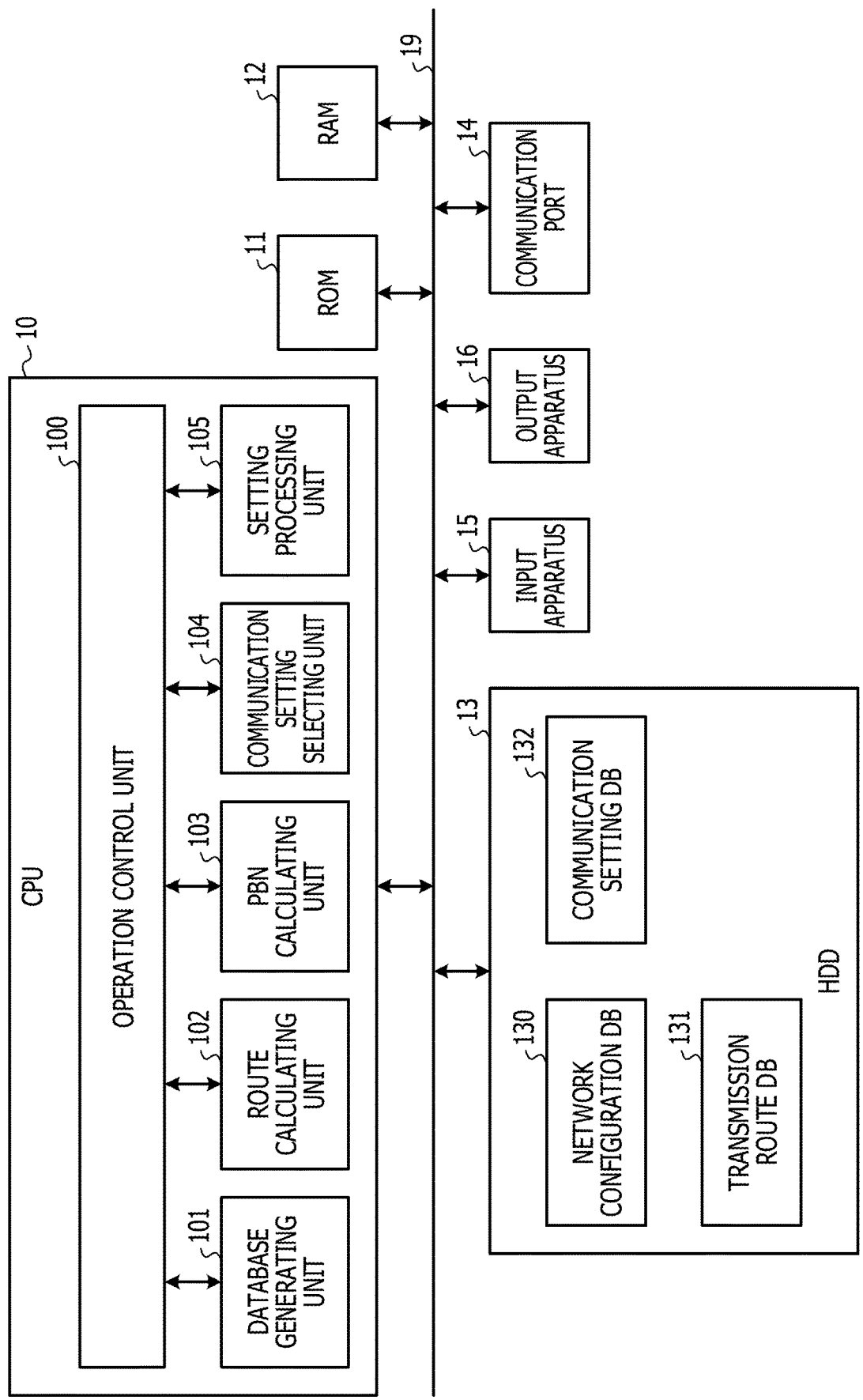
FIG. 6 is a configuration diagram illustrating one example of a network design apparatus.

FIG. 6 is a configuration diagram illustrating one example of a network design apparatus 1. The network design apparatus 1 includes a CPU 10, a read only memory (ROM) 11, a random access memory (RAM) 12, a hard disk drive (HDD) 13, a communication port 14, an input apparatus 15, and an output apparatus 16. The CPU 10 is coupled to the ROM 11, the RAM 12, the HDD 13, the communication port 14, the input apparatus 15, and the output apparatus 16 through a bus 19 so that mutual signal input and output may be carried out.

A program that drives the CPU 10 is stored in the ROM 11. A network design program that carries out a network design method is included in the program. The RAM 12 functions as a working memory of the CPU 10. The communication port 14 is a wireless LAN card and a network interface card (NIC), for example, and processes communication among the CPU 10 and the TP 2, the REG 4, and the ROADM 5.

The input apparatus 15 is an apparatus with which information is input to the network design apparatus 1. As the input apparatus 15, keyboard, mouse, touch panel, and so forth are cited, for example. The input apparatus 15 outputs input information to the CPU 10 through the bus 19.

The output apparatus 16 is an apparatus that outputs information on the network design apparatus 1. As the output apparatus 16, display, touch panel, printer, and so forth are cited, for example. The output apparatus 16 acquires information from the CPU 10 through the bus 19, and outputs the information.

When the CPU 10 reads the program from the ROM 11, an operation control unit 100, a database generating unit 101, a route calculating unit 102, a pass band narrowing (PBN) calculating unit 103, a communication setting selecting unit 104, and a setting processing unit 105 are formed as functions. The operation control unit 100, the database generating unit 101, the route calculating unit 102, the PBN calculating unit 103, the communication setting selecting unit 104, and the setting processing unit 105 may be configured by hardware such as field programmable gate array (FPGA) and application specified integrated circuit (ASIC), for example.

In the HDD 13, a network configuration database (DB) 130, a transmission route database (DB) 131, and a communication setting DB 132 are stored. The HDD 13 is one example of a storing unit.

In the network configuration DB 130, network configuration information and so forth that represent the placement and coupling relationship of the TP 2 and the ROADM 5 about each of nodes A to D like that illustrated in FIG. 1 are registered in advance. In the transmission route DB 131, transmission route information that represents the transmission route R calculated by the CPU 10 is registered. For example, identifiers and so forth of the TP 2 and the WSSs 30a and 30b of each of nodes A to D through which the transmission route R goes are included in the transmission route information.

In the communication setting DB 132, plural operation modes prescribed based on the combination of the multi-level modulation system, the line rate, and the FEC redundancy and parameters such as the baud rate corresponding to the operation mode are registered in association with each other. A description will be made below by taking an example of the communication setting DB 132.

FIG. 7 is a diagram illustrating one example of a communication setting DB. In the communication setting DB 132, the correspondence relationship among an operation mode number (#1 to #7) that represents the operation mode, mode parameters that prescribe the operation mode, the multi-level degree, the baud rate, a band limit value (Bo), penalty, and the OSNR tolerance is registered.

The operation mode number, the mode parameters, the multi-level degree, and the baud rate are registered in the communication setting DB 132 in advance. In the mode parameters, the multi-level modulation system, the line rate, and the FEC redundancy are included. In the multi-level modulation system, as one example, DP-QPSK, DP-8-QAM, DP-16-QAM, and so forth corresponding to modulation processing that may be executed by the DSPs 20, 40a, and 40b are registered.

In the line rate, as one example, assuming that the transmission speed of the client signal is 100 (Gbps), for example, 200 (Gbps) (=100×2) corresponding to an optical signal that accommodates two client signals and 300 (Gbps) (=100×3) corresponding to an optical signal that accommodates three client signals are registered. In the FEC redundancy, as one example, 15(%) and 20(%) are registered.

As the multi-level degree, values decided according to the multi-level modulation system are registered. For example, a multi-level degree "2" is registered in the case of DP-QPSK and a multi-level degree "4" is registered in the case of DP-16-QAM. As the baud rate, values calculated from the multi-level modulation system, the line rate, and the FEC redundancy are registered.

In the band limit value, the penalty, and the OSNR tolerance, values calculated from the mode parameters, the multi-level degree, and the baud rate by the CPU 10 based on a simulation are registered. The band limit value is one example of the lower-limit value of the bandwidth of the optical signal for keeping given quality of the optical signal. For example, the band limit value represents the lower-limit value of the bandwidth with which the TP 2 on the receiving side (receiving-side TP 2b) may normally receive the optical signal without detecting a synchronization error.

The penalty is one example of the deterioration amount of the Q-factor in the TP 2 on the receiving side (receiving-side TP 2b). For example, the penalty represents the decrease amount of the power of the optical signal. The OSNR tolerance is as described above and is the minimum value of the OSNR for keeping given quality of the optical signal (for example, for causing the bit error rate to be 0 or lower).

As above, the HDD 13 stores the correspondence relationship between the combination of the mode parameters, the multi-level degree, and the baud rate and the band limit value, the penalty, and the OSNR tolerance.

Referring to FIG. 6 again, the operation control unit 100 controls operation of the database generating unit 101, the route calculating unit 102, the PBN calculating unit 103, the communication setting selecting unit 104, and the setting processing unit 105 so that network design processing may be executed in a given sequence. Various kinds of instructions and numerical values are input from the operation control unit 100 to the database generating unit 101, the route calculating unit 102, the PBN calculating unit 103, the communication setting selecting unit 104, and the setting processing unit 105, and these units 101 to 105 execute various kinds of processing according to the input and output the result thereof to the operation control unit 100.

The database generating unit 101 calculates the band limit value, the penalty, and the OSNR tolerance corresponding to each operation mode of the communication setting DB 132, and registers them in the communication setting DB 132 before network design. For example, the database generating unit 101 includes a simulator that calculates the transmission performance based on various kinds of conditions, and calculates the band limit value, the penalty, and the OSNR tolerance as a simulation result thereof. The band limit value, the penalty, and the OSNR tolerance are calculated from the mode parameters, the multi-level degree, and the baud rate of the TP 2 on the transmitting side (transmitting-side TP 2a) irrespective of the transmission route R.

The route calculating unit 102 calculates one or more transmission routes R through which the optical signal is transmitted based on the network configuration DB 130, and registers transmission route information thereof in the transmission route DB 131. For example, the route calculating unit 102 acquires information on the starting-point node and the ending-point node input from the input apparatus 15 and calculates the shortest transmission route R that links the starting-point node and the ending-point node by the Dijkstra's algorithm or the like.

The PBN calculating unit 103 is one example of a band calculating unit and calculates a bandwidth B of the optical signal after narrowing by the wavelength filter (hereinafter, represented as "narrowed bandwidth") from the number of wavelength filters on the transmission route R of the optical signal. For example, the PBN calculating unit 103 calculates the narrowed bandwidth B by counting the number of WSSs 30a and 30b on the transmission route R and adding up the narrowing amount of the respective WSSs 30a and 30b based on the number. For example, in the case of the transmission route R illustrated in FIG. 1, the narrowed bandwidth B is equivalent to the bandwidth We of the optical signal output from the WSS 30a at the last stage of the transmission route R. The narrowed bandwidth B is used by the communication setting selecting unit 104 for selection of the operation mode.

The communication setting selecting unit 104 selects the operation modes of the line rate input from the input apparatus 15 from the communication setting DB 132. Thereby, the communication setting selecting unit 104 narrows down the operation modes that meet the request for the line rate from the communication setting DB 132.

The communication setting selecting unit 104 is one example of a selecting unit and selects the operation modes in which the band limit value Bo is equal to or smaller than the narrowed bandwidth B from the respective operation modes of the communication setting DB 132. At this time, the combination of the multi-level modulation system, the baud rate, and the FEC redundancy of the respective operation modes of the communication setting DB 132 is one example of a plurality of combinations, and the combination of the multi-level modulation system, the baud rate, and the FEC redundancy of the selected operation mode is one example of a first combination.

This allows the communication setting selecting unit 104 to select the operation modes that may withstand pass band narrowing caused by the WSSs 30a and 30b on the transmission route R from the communication setting DB 132. Due to this, candidates for the baud rate set in the DSPs 20, 40a, and 40b are narrowed down to baud rates equal to or lower than a given value set in consideration of the pass band narrowing.

The communication setting selecting unit 104 further selects the operation mode based on the OSNR tolerance from the respective operation modes that have been already selected based on the narrowed bandwidth B. At this time, the combination of the multi-level modulation system, the baud rate, and the FEC redundancy of the selected operation mode is one example of a second combination.

This allows the communication setting selecting unit 104 to select the operation mode with favorable OSNR tolerance from the communication setting DB 132. Due to this, candidates for the multi-level modulation system set in the DSPs 20, 40a, and 40b are narrowed down to multi-level modulation systems with multi-level degrees equal to or lower than a given value set in consideration of the OSNR.

Therefore, the communication setting selecting unit 104 may select the favorable operation mode in terms of the pass band narrowing and the OSNR. Thus, the network design apparatus 1 may carry out proper network design in consideration of the pass band narrowing and the OSNR.

The communication setting selecting unit 104 selects the operation mode with the lowest OSNR tolerance as one example. This allows the communication setting selecting unit 104 to select the operation mode with the favorable OSNR tolerance. The communication setting selecting unit 104 may select not only the operation mode with the lowest OSNR tolerance and also an operation mode in which the OSNR tolerance is equal to or lower than a given value.

If plural operation modes exist as the operation modes with the lowest OSNR tolerance, the communication setting selecting unit 104 selects the operation mode with the lowest penalty in the operation modes. This allows the communication setting selecting unit 104 to narrow down the operation modes based on the penalty.

The communication setting selecting unit 104 outputs the operation mode narrowed down in the above-described manner to the output apparatus 16, for example. The output apparatus 16 displays the operation mode on a screen, for example. This allows the operator of the WDM network 91 to check the optimum operation mode.

The setting processing unit 105 sets the multi-level modulation system, the line rate, the FEC redundancy, and the baud rate of the operation mode narrowed down in the above-described manner in the respective TPs 2 on the transmitting side and the receiving side. Thus, the operator is spared the trouble of manually setting each TP 2.

Next, processing of the network design apparatus 1 will be described. The procedure of the processing of the network design apparatus 1 is one example of the network design method.

Figure 8:
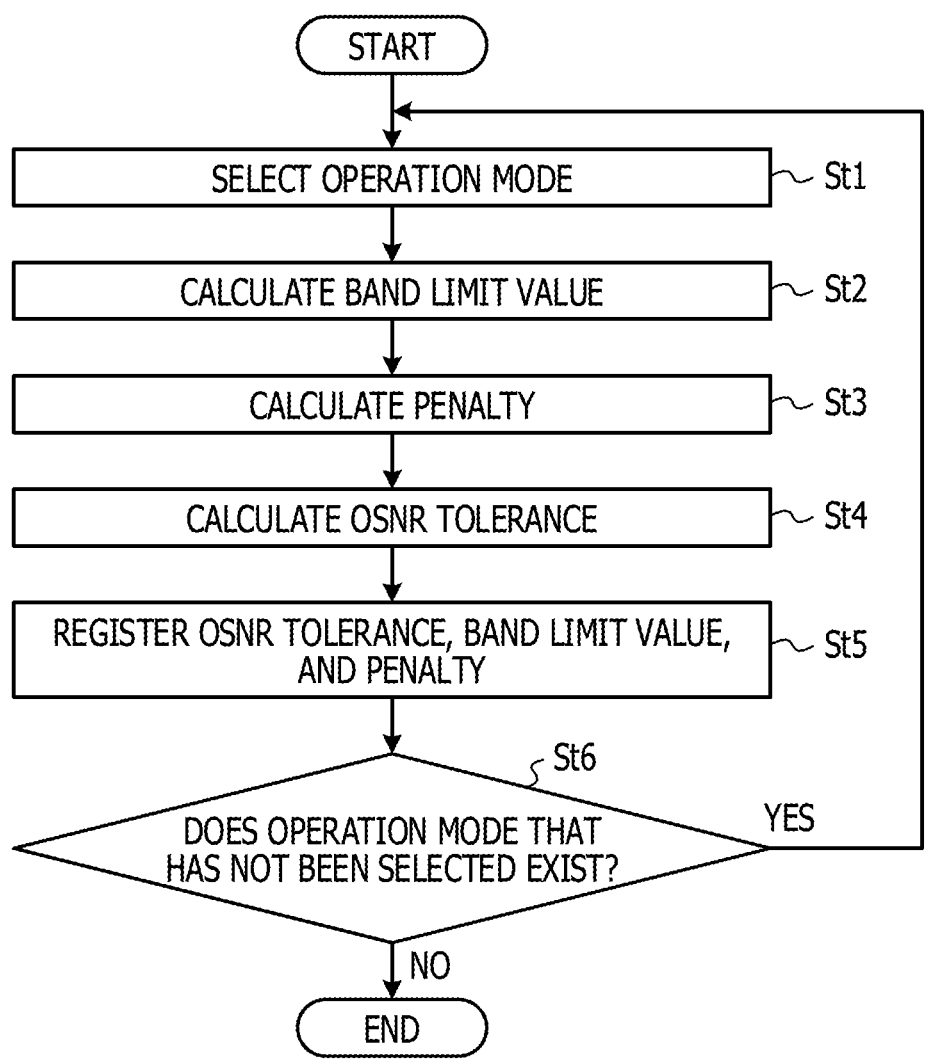
FIG. 8 is a flowchart illustrating one example of a generation processing of a communication setting database.

FIG. 8 is a flowchart illustrating one example of generation processing of a communication setting DB. The communication setting DB illustrated by reference to in FIG. 8 may be the communication setting DB 132 illustrated in FIG. 6. The present processing is executed before network design.

The database generating unit 101 selects one operation mode from the communication setting DB 132 (step St1). The order of selection of the operation mode is not limited.

Next, the database generating unit 101 calculates the band limit value from the mode parameters, the multi-level degree, and the baud rate (step St2). Next, the database generating unit 101 calculates the penalty from the mode parameters, the multi-level degree, and the baud rate (step St3). Next, the database generating unit 101 calculates the OSNR tolerance from the mode parameters, the multi-level degree, and the baud rate (step St4).

Next, the database generating unit 101 registers the calculated OSNR tolerance, band limit value, and penalty in the communication setting DB 132 (step St5). Next, the database generating unit 101 determines whether or not an operation mode that has not been selected in the respective operation modes of the communication setting DB 132 (step St6) exists. If an operation mode that has not been selected exists (Yes of the step St6), the respective kinds of processing of the step St1 and the subsequent steps are executed again.

If an operation mode that has not been selected does not exist (No of the step St6), the processing ends. In this manner, the generation processing of the communication setting DB 132 is executed.

Figure 9:
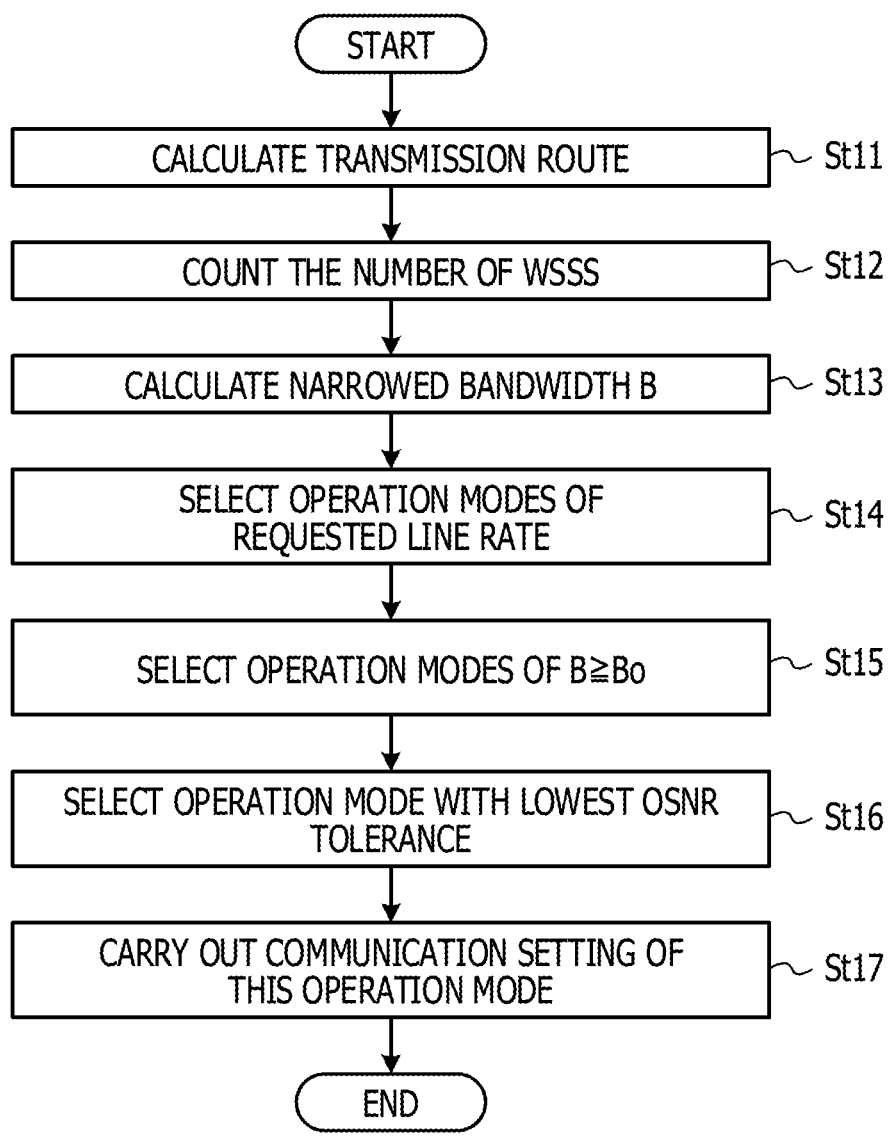
FIG. 9 is a flowchart illustrating one example of communication setting processing.

FIG. 9 is a flowchart illustrating one example of communication setting processing. Execution of the present processing is triggered by reception of an instruction of network design from the input apparatus 15 by the operation control unit 100, for example. In the instruction of network design, the starting-point node and the ending-point node of the transmission route R of the optical signal and the line rate are specified, for example. In the present example, a description will be made by taking the transmission route R illustrated in FIG. 1.

The route calculating unit 102 calculates the transmission route R that links starting-point node A and ending-point node D based on the network configuration DB 130 (step St11). The Dijkstra's algorithm is cited as the calculation method of the transmission route R. However, the calculation method is not limited thereto.

Next, the PBN calculating unit 103 counts the number of WSSs on the transmission route R, for example, the number of wavelength filters (step St12). Because four WSSs 30a and 30b exist on the transmission route R, the number of WSSs is four. If arrayed waveguide gratings (AWG) are set on the transmission route R instead of the WSSs 30a and 30b or in addition to the WSSs 30a and 30b, the PBN calculating unit 103 counts the number of wavelength filters of the AWGs similarly to the WSSs 30a and 30b.

Next, the PBN calculating unit 103 calculates the narrowed bandwidth B from the number of WSSs (step St13). At this time, the PBN calculating unit 103 calculates the narrowed bandwidth B by adding up the narrowing amount of the respective WSSs 30a and 30b based on the number of WSSs. The narrowed bandwidth B is calculated as 47 (GHz) from the number of WSSs=4, for example.

Next, the communication setting selecting unit 104 selects the operation modes of the line rate requested through the input apparatus 15 (step St14). For example, if the line rate is 200 (Gbps), the respective operation modes of operation mode numbers #1 to #5 are selected.

Next, the communication setting selecting unit 104 selects the operation modes in which the band limit value Bo is equal to or smaller than the narrowed bandwidth B from the respective operation modes of operation mode numbers #1 to #5 (step St15). If the narrowed bandwidth B is 47 (GHz), the communication setting selecting unit 104 selects the respective operation modes of operation mode number #2 with band limit value Bo=46 (GHz), of operation mode number #3 with band limit value Bo=30 (GHz), and of operation mode number #5 with band limit value Bo=28 (GHz). The combinations of the multi-level modulation system, the baud rate, and the FEC redundancy of the respective operation modes of operation mode numbers #2, #3, and #5 correspond to the first combinations.

Next, the communication setting selecting unit 104 selects the operation mode with the lowest OSNR tolerance in the respective operation modes of operation mode numbers #2, #3, and #5 (step St16). The OSNR tolerances of the respective operation modes of operation mode numbers #2, #3, and #5 are 20 (dB), 25 (dB), and 30 (dB), respectively, and thus the communication setting selecting unit 104 selects the operation mode of operation mode number #2. The combination of the multi-level modulation system, the baud rate, and the FEC redundancy of the operation mode of operation mode number #2 corresponds to the second combination.

Next, the setting processing unit 105 carries out communication setting of the operation mode of operation mode number #2 (step St17). For example, the setting processing unit 105 sets the line rate (200 (Gbps)), the multi-level modulation system (DP-8-QAM), the baud rate (46 (Gbaud)), and the FEC redundancy (20(%)) of the operation mode of operation mode number #2 in the transmitting-side TP 2a and the receiving-side TP 2b. The communication setting processing is executed in this manner. In the present example, the FEC redundancy is included in the mode parameters, and therefore the communication setting selecting unit 104 may select the proper FEC redundancy. However, the FEC redundancy does not have to be included in the mode parameters.

In the present example, the route calculating unit 102 calculates only one transmission route R. However, the route calculating unit 102 may calculate plural transmission routes. In this case, the communication setting selecting unit 104 calculates the Q-factor of the receiving side regarding each transmission route and determines whether or not transmission of the optical signal is possible based on the Q-factor. The communication setting selecting unit 104 divides the transmission route in which transmission of the optical signal is difficult into plural optical termination sections, and sets the transmission route with the fewest optical termination sections in the WDM network 91. Processing of the network design apparatus 1 in this case will be described below.

Figure 10A:
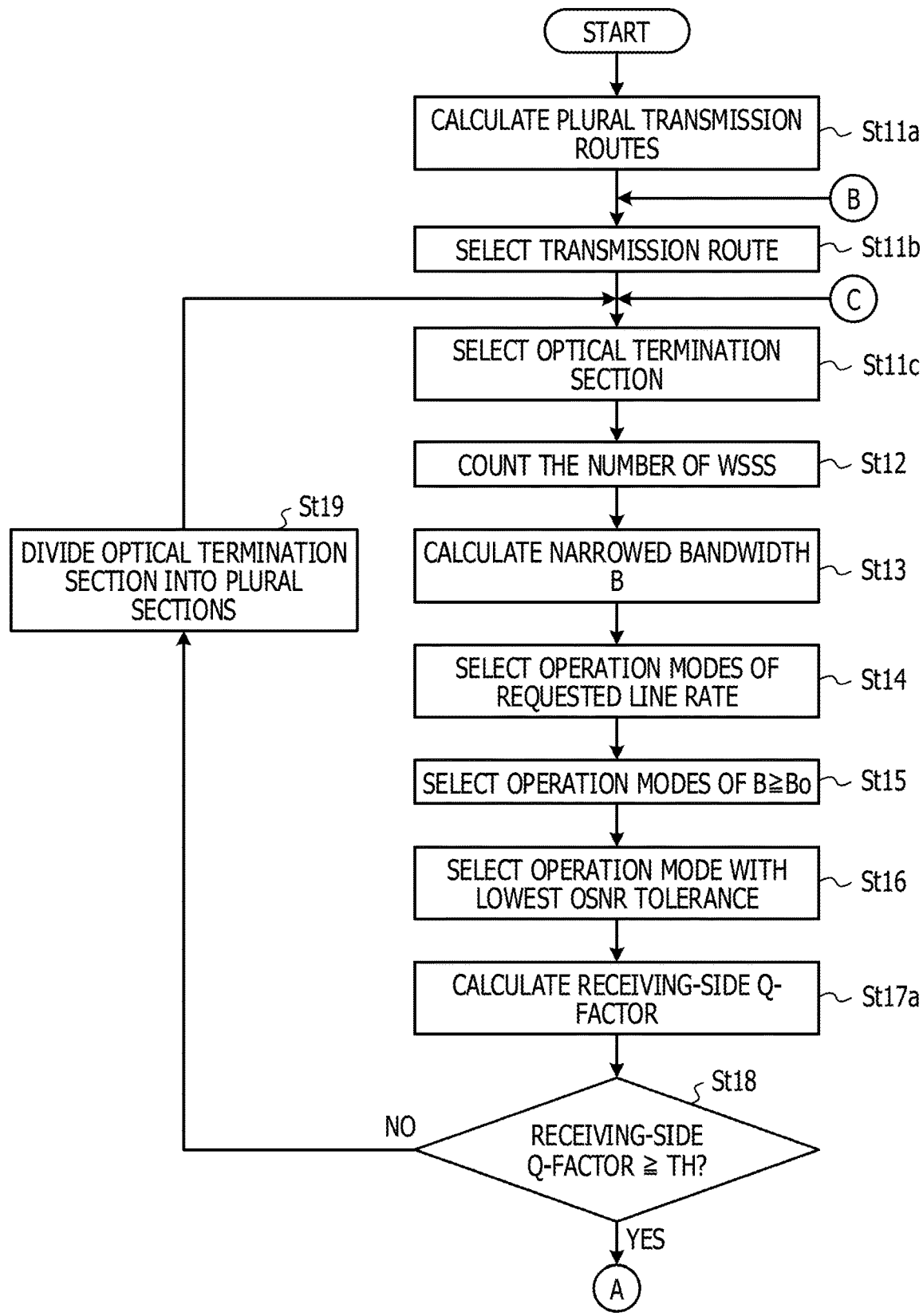
FIGS. 10A and 10B are flowcharts illustrating another example of the communication setting processing.
Figure 10B:
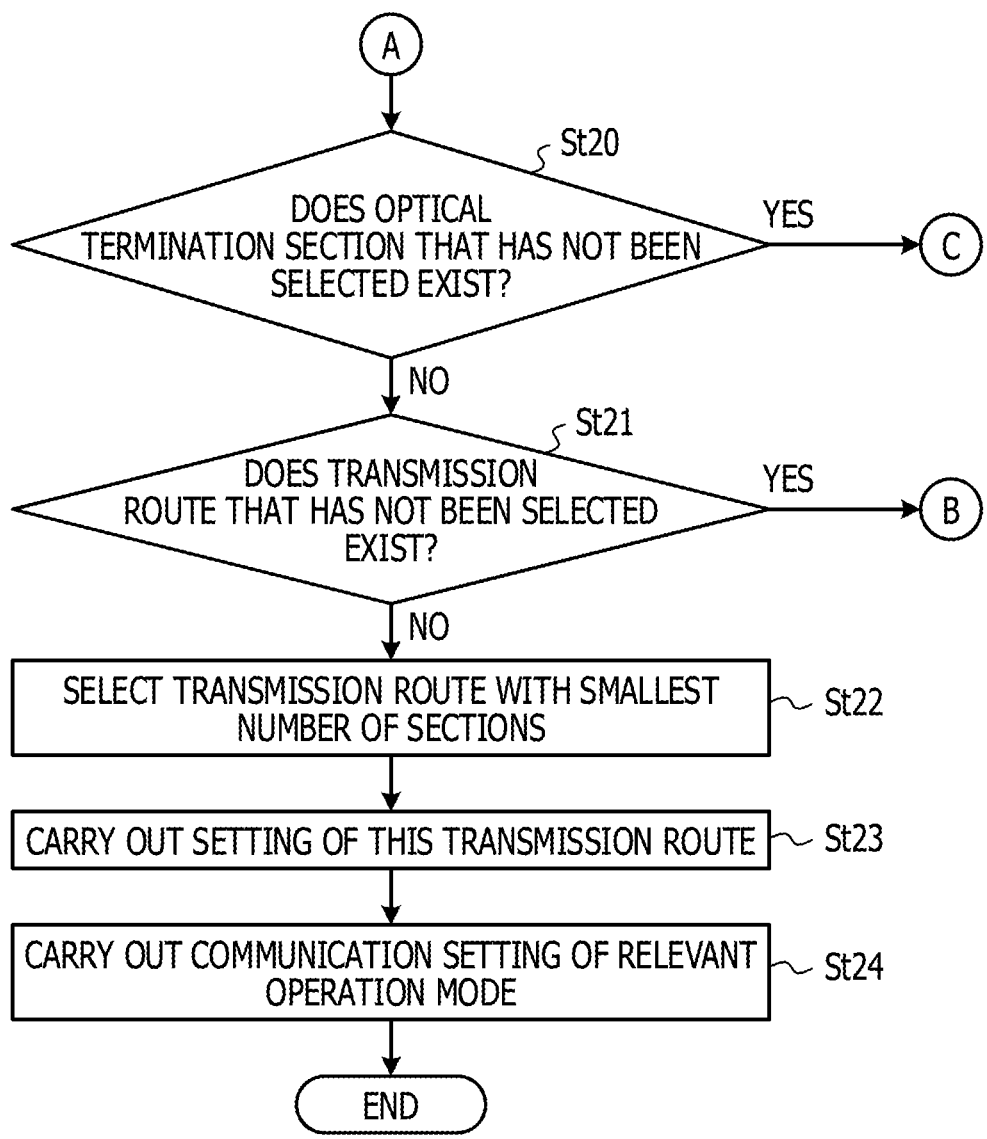

FIG. 10 is a flowchart illustrating another example of the communication setting processing. In FIG. 10, processing common to FIG. 9 is given the same symbol, and description thereof is omitted.

The route calculating unit 102 calculates plural transmission routes (step St11a). The calculated plural transmission routes are registered in the transmission route DB 131. Next, the communication setting selecting unit 104 selects one transmission route from the respective transmission routes of the transmission route DB 131 (step St11b).

Next, the communication setting selecting unit 104 selects one of optical termination sections of the currently-selected transmission route (step St11c). Next, the PBN calculating unit 103 and the communication setting selecting unit 104 execute the respective kinds of processing of the above-described steps St12 to St16 regarding the currently-selected optical termination section.

Next, the communication setting selecting unit 104 calculates the Q-factor of the receiving side when the optical signal is transmitted to the currently-selected optical termination section (step St17a). At this time, the communication setting selecting unit 104 calculates the Q-factor of the receiving side by carrying out a simulation, for example, from the line rate, the multi-level modulation system, the baud rate, and the FEC redundancy of the operation mode selected in the step St16.

Next, the communication setting selecting unit 104 compares the Q-factor of the receiving side with a given threshold TH (step St18). If the Q-factor of the receiving side is lower than a threshold TH (No of the step St18), the communication setting selecting unit 104 determines that it is difficult for the currently-selected optical termination section of the transmission route to transmit the optical signal, and divides the currently-selected optical termination section into plural optical termination sections (step St19).

For example, the communication setting selecting unit 104 assumes that the REG 4 is coupled to the ROADM 5 at a node in the middle of the currently-selected optical termination section, and generates new optical termination sections with the REG 4 being the boundary. Thereafter, the processing of the steps St11c to St18 is executed again regarding each of the new optical termination sections obtained by the dividing. Thereby, the communication setting selecting unit 104 divides the optical termination section in which the Q-factor of the receiving side is lower than the given threshold TH into plural optical termination sections in which the Q-factors of the receiving side are each equal to or higher than the given threshold TH.

If the Q-factor of the receiving side is equal to or higher than the given threshold TH (Yes of the step St18), the communication setting selecting unit 104 determines whether or not an optical termination section that has not been selected exists (step St20). If an optical termination section that has not been selected exists (Yes of the step St20), this optical termination section is selected (step St11c), and the respective kinds of processing of the step St12 and the subsequent steps are executed again regarding the optical termination section.

If an optical termination section that has not been selected does not exist (No of the step St20), the communication setting selecting unit 104 determines whether or not a transmission route that has not been selected exists in the respective transmission routes of the transmission route DB 131 (step St21). If a transmission route that has not been selected exists (Yes of the step St21), this transmission route is selected (step St11b), and the respective kinds of processing of the step St11c and the subsequent steps are executed again regarding the transmission route.

If a transmission route that has not been selected does not exist (No of the step St21), the communication setting selecting unit 104 selects the transmission route with the smallest number of optical termination sections, for example, the transmission route with the fewest REGs 4, in the respective transmission routes of the transmission route DB 131 (step St22). Due to this, the number of REGs 4 on the transmission route becomes the smallest, and the facility cost of the WDM network 91 is reduced.

Next, the setting processing unit 105 carries out setting of the selected transmission route for the WDM network 91 (step St23). At this time, the setting processing unit 105 carries out wavelength setting of the WSSs 30a and 30b and so forth for the ROADM 5 of each node on the transmission route according to whether or not the REG 4 exists.

Next, the setting processing unit 105 carries out communication setting of the operation mode selected in the step St16 (step St24). The communication setting processing is executed in this manner.

Next, a description will be made by taking an operation example of the communication setting processing of the present example.

Figure 11:
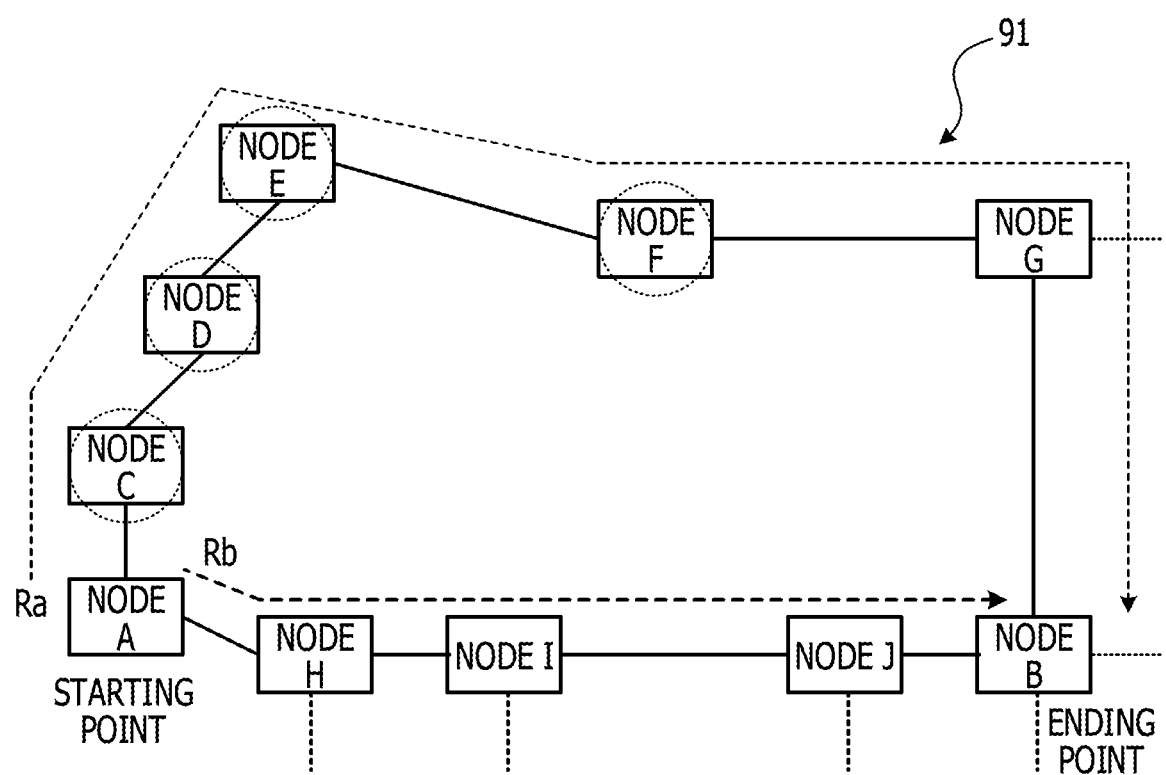
FIG. 11 is a configuration diagram illustrating another example of the WDM network.

FIG. 11 is a configuration diagram illustrating another example of the WDM network. In the WDM network 91, nodes A to J coupled to make a ring shape are included. The form of the WDM network 91 is not limited to the ring shape and may be a mesh shape.

The ILAs 6 are set at nodes C to F (see dotted-line circles), and the ROADMs 5 are set at the other nodes A, B, H, I, and J. Here, it is assumed that the starting-point node is node A, and the ending-point node is node B.

It is assumed that the route calculating unit 102 calculates two transmission routes Ra and Rb. The transmission route Ra goes through nodes A, C to G, and B in that order, and the transmission route Rb goes through nodes A, H, I, J, and B in that order.

Figure 12:
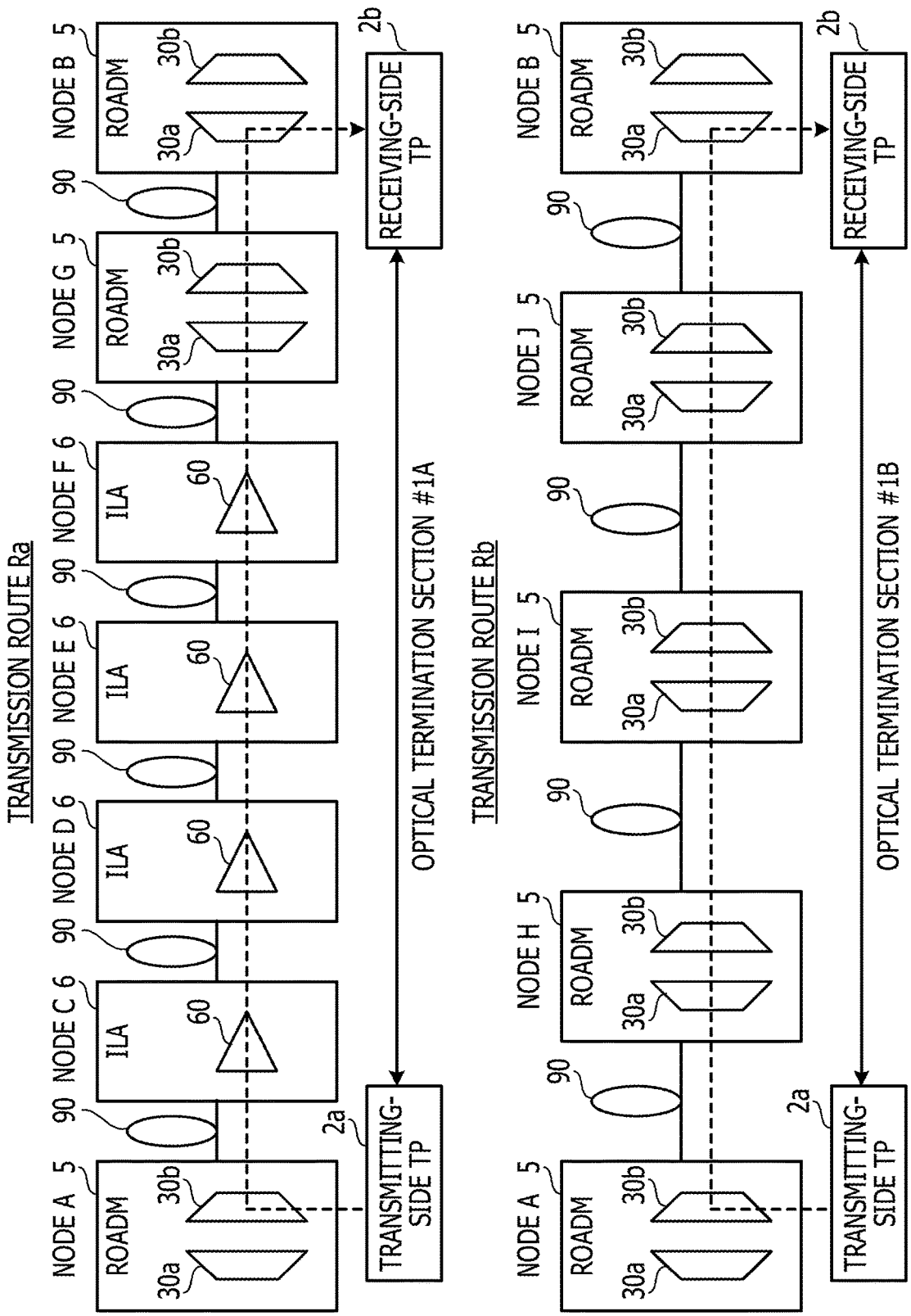
FIG. 12 is a diagram illustrating transmission routes.

FIG. 12 is a diagram illustrating the transmission routes. In FIG. 12, a configuration common to FIG. 1 is given the same symbol, and description thereof is omitted. In the following, with reference to FIG. 12 and FIG. 6, processing of the network design apparatus 1 will be described along the flowchart illustrated in FIG. 10.

The route calculating unit 102 calculates the transmission routes Ra and Rb (step St11a). The communication setting selecting unit 104 selects the transmission route Ra (step St11b), and subsequently selects the optical termination section #1A of the transmission route Ra (step St11c). The REG 4 is not set on the transmission route Ra. Thus, only the optical termination section #1A from the transmitting-side TP 2a of starting-point node A to ending-point node B exists, and no other optical termination section exists.

Next, the PBN calculating unit 103 counts four, which is the number of WSSs 30a and 30b, as the number of wavelength filters on the transmission route Ra (step St12). Next, the PBN calculating unit 103 figures out 47 (GHz) as the narrowed bandwidth B (step St13).

Next, the communication setting selecting unit 104 selects the respective operation modes of operation mode numbers #1 to #5 corresponding to 200 (Gbps) as the line rate requested through the input apparatus 15 in the operation modes of the communication setting DB 132 (step St14). Next, the communication setting selecting unit 104 selects the respective operation modes of operation mode numbers #2, #3, and #5, in which the band limit value Bo is equal to or smaller than the narrowed bandwidth B (corresponding to the first combinations), in the respective operation modes of operation mode numbers #1 to #5 (step St15).

Next, the communication setting selecting unit 104 selects the operation mode of operation mode number #2 with the lowest OSNR tolerance (corresponding to the second combination) in the respective operation modes of operation mode numbers #2, #3, and #5 (step St16). Next, the communication setting selecting unit 104 calculates the Q-factor of the receiving side in accordance with the mode parameters, the multi-level degree, and the baud rate of the operation mode of operation mode number #2 (step St17a). Here, suppose that the Q-factor of the receiving side is 10 (dB).

Next, the communication setting selecting unit 104 compares the Q-factor of the receiving side with the threshold TH (step St18). Assuming that the threshold TH is 7 (dB), because Q-factor of the receiving side threshold TH holds (Yes of the step St18), the communication setting selecting unit 104 determines that it is possible to transmit the optical signal to the optical termination section #1A, and ends the processing relating to the optical termination section #1A.

Next, because no other optical termination section exists (No of the step St20), the communication setting selecting unit 104 selects the other transmission route Rb (Yes of the step St21, St11b). Because the REG 4 is not set on the transmission route Rb, only the optical termination section #1B from the transmitting-side TP 2a of starting-point node A to ending-point node B exists, and no other optical termination section exists.

Next, the PBN calculating unit 103 counts eight, which is the number of WSSs 30a and 30b, as the number of wavelength filters on the transmission route Rb (step St12). Next, the PBN calculating unit 103 figures out 29 (GHz) as the narrowed bandwidth B (step St13).

Next, the communication setting selecting unit 104 selects the respective operation modes of operation mode numbers #1 to #5 corresponding to 200 (Gbps) as the line rate requested through the input apparatus 15 in the operation modes of the communication setting DB 132 (step St14). Next, the communication setting selecting unit 104 selects the operation mode of operation mode number #5, in which the band limit value Bo is equal to or smaller than the narrowed bandwidth B (corresponding to the first combination), in the respective operation modes of operation mode numbers #1 to #5 (step St15).

Next, although only one operation mode exists as the currently-selected operation mode, the communication setting selecting unit 104 selects the operation mode of operation mode number #5 with the lowest OSNR tolerance (corresponding to the second combination) (step St16). Next, the communication setting selecting unit 104 calculates the Q-factor of the receiving side in accordance with the mode parameters, the multi-level degree, and the baud rate of the operation mode of operation mode number #5 (step St17a). Here, suppose that the Q-factor of the receiving side is 4 (dB).

Next, the communication setting selecting unit 104 compares the Q-factor of the receiving side with the threshold TH (step St18). Assuming that the threshold TH is 7 (dB), because Q-factor of the receiving side<threshold TH holds (No of the step St18), the communication setting selecting unit 104 divides the currently-selected optical termination section #1B into plural optical termination sections by the REG 4 (step St19).

Figure 13:
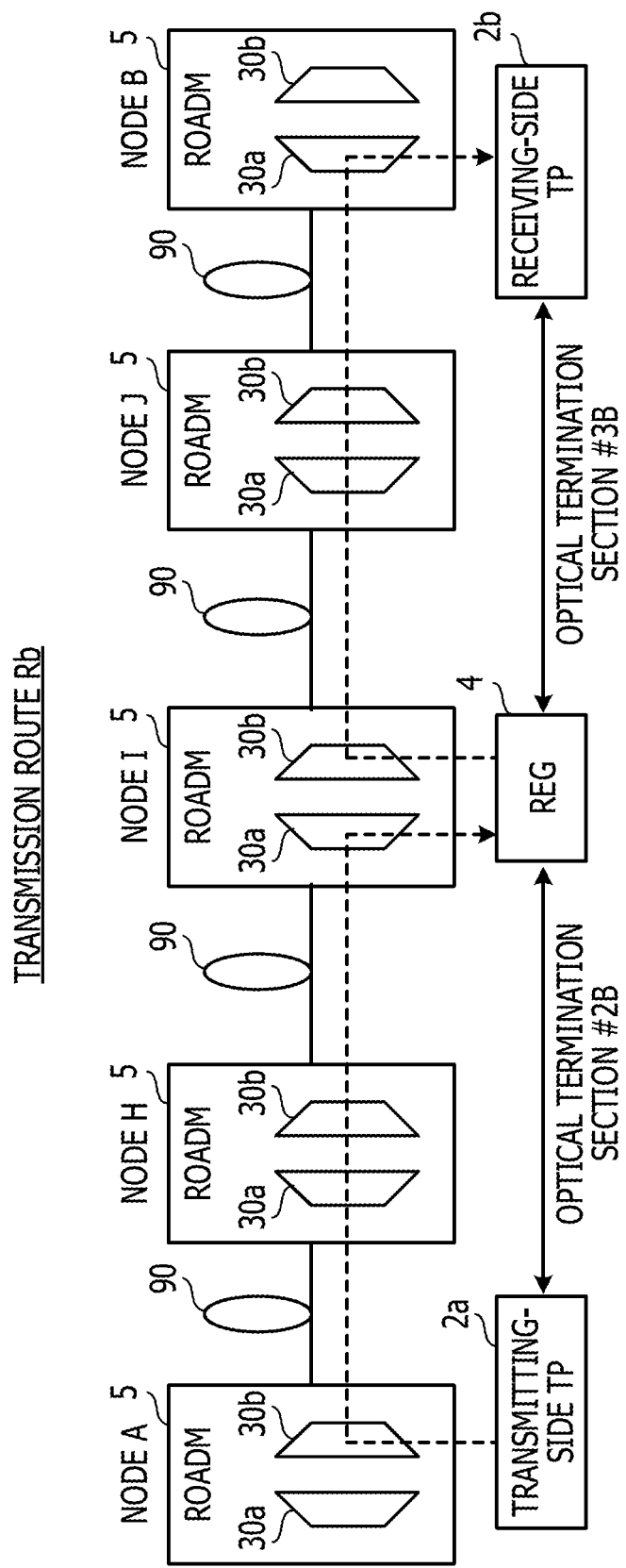
FIG. 13 is a diagram illustrating a transmission route divided into plural optical termination sections.

FIG. 13 is a diagram illustrating the transmission route divided into plural optical termination sections. For example, assuming that the REG 4 is set at node I, which is the middle point of the transmission route Rb, the communication setting selecting unit 104 sets optical termination sections #2B and #3B with the REG 4 being the boundary. The optical termination section #2B is the section from the transmitting-side TP 2a of starting-point node A to the REG 4 of node I, and the optical termination section #3B is the section from the REG 4 of node I to the receiving-side TP 2b of ending-point node B. The following description will be made with reference to FIG. 13.

The communication setting selecting unit 104 selects the optical termination section #2B (step St11c). Next, the PBN calculating unit 103 counts four, which is the number of WSSs 30a and 30b, as the number of wavelength filters on the optical termination section #2B (step St12). Next, the PBN calculating unit 103 figures out 47 (GHz) as the narrowed bandwidth B (step St13).

Next, the communication setting selecting unit 104 selects the respective operation modes of operation mode numbers #1 to #5 corresponding to 200 (Gbps) as the line rate requested through the input apparatus 15 in the operation modes of the communication setting DB 132 (step St14). Next, the communication setting selecting unit 104 selects the respective operation modes of operation mode numbers #2, #3, and #5, in which the band limit value Bo is equal to or smaller than the narrowed bandwidth B (corresponding to the first combinations), in the respective operation modes of operation mode numbers #1 to #5 (step St15).

Next, the communication setting selecting unit 104 selects the operation mode of operation mode number #2 with the lowest OSNR tolerance (corresponding to the second combination) in the respective operation modes of operation mode numbers #2, #3, and #5 (step St16). Next, the communication setting selecting unit 104 calculates the Q-factor of the receiving side in accordance with the mode parameters, the multi-level degree, and the baud rate of the operation mode of operation mode number #2 (step St17a). Here, suppose that the Q-factor of the receiving side is 10 (dB).

Next, the communication setting selecting unit 104 compares the Q-factor of the receiving side with the threshold TH (step St18). Assuming that the threshold TH is 7 (dB), because Q-factor of the receiving side≥threshold TH holds (Yes of the step St18), the communication setting selecting unit 104 determines that it is possible to transmit the optical signal to the optical termination section #2B, and ends the processing relating to the optical termination section #2B.

Next, because the optical termination section #3B, which has not been selected, exists (Yes of the step St20), the communication setting selecting unit 104 selects this optical termination section #3B (step St11c). Next, the PBN calculating unit 103 counts four, which is the number of WSSs 30a and 30b, as the number of wavelength filters on the optical termination section #3B (step St12). Next, the PBN calculating unit 103 figures out 47 (GHz) as the narrowed bandwidth B (step St13).

Next, the communication setting selecting unit 104 selects the respective operation modes of operation mode numbers #1 to #5 corresponding to 200 (Gbps) as the line rate requested through the input apparatus 15 in the operation modes of the communication setting DB 132 (step St14). Next, the communication setting selecting unit 104 selects the respective operation modes of operation mode numbers #2, #3, and #5, in which the band limit value Bo is equal to or smaller than the narrowed bandwidth B (corresponding to the first combinations), in the respective operation modes of operation mode numbers #1 to #5 (step St15).

Next, the communication setting selecting unit 104 selects the operation mode of operation mode number #2 with the lowest OSNR tolerance (corresponding to the second combination) in the respective operation modes of operation mode numbers #2, #3, and #5 (step St16). Next, the communication setting selecting unit 104 calculates the Q-factor of the receiving side in accordance with the mode parameters, the multi-level degree, and the baud rate of the operation mode of operation mode number #2 (step St17a). Here, suppose that the Q-factor of the receiving side is 10 (dB).

Next, the communication setting selecting unit 104 compares the Q-factor of the receiving side with the threshold TH (step St18). Assuming that the threshold TH is 7 (dB), because Q-factor of the receiving side≥threshold TH holds (Yes of the step St18), the communication setting selecting unit 104 determines that it is possible to transmit the optical signal to the optical termination section #3B, and ends the processing relating to the optical termination section #3B.

Next, because no other optical termination section exists (No of the step St20), and a transmission route that has not been selected also does not exist (No of the step St21), the communication setting selecting unit 104 selects the transmission route R with the smallest number of optical termination sections (step St22). For example, the communication setting selecting unit 104 selects the transmission route with the fewest REGs 4 on the transmission route Ra or Rb. Thereby, the installation cost of the REG 4 is reduced. Transmission route information of the transmission routes Ra and Rb designed in this manner is registered in the transmission route DB 131.

Next, the setting processing unit 105 carries out setting of the transmission routes Ra and Rb for the WDM network 91 (step St23) and carries out communication setting of the operation mode of each of the transmission routes Ra and Rb for the TPs 2 (transmitting-side TP 2a and receiving-side TP 2b) and the REG 4 (step St24).

As above, the communication setting selecting unit 104 calculates the Q-factor of the receiving side of the optical signal in accordance with the mode parameters, the multi-level degree, and the baud rate of the operation mode selected based on the OSNR tolerance, and selects one of the transmission routes Ra and Rb based on the Q-factor of the receiving side. This allows the network design apparatus 1 to select the transmission route Ra with the best transmission quality from the plural transmission routs Ra and Rb.

Moreover, the communication setting selecting unit 104 divides the transmission route Rb, in which the Q-factor of the receiving side is lower than the given threshold TH, into plural optical termination sections #2B and #3B, in which the Q-factors of the receiving side are each equal to or higher than the given threshold TH, and selects the transmission route Ra with the smallest number of optical termination sections in the transmission routes Ra and Rb. This allows the network design apparatus 1 to design the WDM network 91 in such a manner that the installation cost of the REG 4 is reduced.

The above-described embodiment is an example of preferred implementation of the present disclosure. However, techniques of the present disclosure are not limited thereto and may be carried out with various modifications without departing from the gist of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network design apparatus comprising:
a memory configured to store a correspondence relationship between a plurality of combinations of a multi-level modulation system and a baud rate about an optical signal set in a transmitting apparatus that transmits and receives the optical signal and a lower-limit value of a bandwidth and a minimum value of an optical signal-to-noise ratio about the optical signal for keeping given quality of the optical signal when the multi-level modulation system and the baud rate are set in the transmitting apparatus; and
a processor coupled to the memory and configured to:
calculate, from a number of wavelength filters on a transmission route of the optical signal, the bandwidth of the optical signal after narrowing by the wavelength filters, and
select one or more first combinations about which the lower-limit value of the bandwidth is equal to or smaller than the bandwidth of the optical signal after narrowing from the plurality of combinations and select a second combination about which the minimum value of the optical signal-to-noise ratio is smallest from the one or more first combinations.

2. The network design apparatus according to claim 1, wherein
the memory stores a correspondence relationship between the plurality of combinations, the lower-limit value of the bandwidth, and the minimum value of the optical signal-to-noise ratio and a deterioration amount of a Q-factor of a receiving side of the optical signal, and
the processor selects the second combination about which the minimum value of the optical signal-to-noise ratio is smallest, and the deterioration amount is smallest from the one or more first combinations.

3. The network design apparatus according to claim 2, wherein the processor
calculates a plurality of transmission routes through which the optical signal is transmitted,
calculates the bandwidth of the optical signal after narrowing by the wavelength filters regarding each of the plurality of transmission routes, and
regarding each of the plurality of transmission routes, selects the one or more first combinations from the plurality of combinations, selects the second combination from the one or more first combinations based on the minimum value of the optical signal-to-noise ratio, calculates the Q-factor of the receiving side of the optical signal in accordance with the selected second combination, and selects one of the plurality of transmission routes based on the Q-factor of the receiving side.

4. The network design apparatus according to claim 3, wherein
the processor
divides a transmission route in which the Q-factor of the receiving side is lower than a given threshold in the plurality of transmission routes into a plurality of optical termination sections in which the Q-factors of the receiving side are each equal to or higher than the given threshold, and in which the optical signals are each terminated, and
selects a transmission route with a smallest number of the plurality of optical termination sections in the plurality of transmission routes.

5. The network design apparatus according to claim 4, wherein
the processor sets the multi-level modulation system and the baud rate included in the second combination in the transmitting apparatus.

6. The network design apparatus according to claim 4, wherein
the memory stores a correspondence relationship between the plurality of combinations of the multi-level modulation system, the baud rate, and redundancy of an error correction code about the optical signal set in the transmitting apparatus and the lower-limit value of the bandwidth and the minimum value of the optical signal-to-noise ratio about the optical signal for keeping the given quality of the optical signal when the multi-level modulation system, the baud rate, and the redundancy of the error correction code are set in the transmitting apparatus.

7. A network design method comprising:
calculating, from a number of wavelength filters on a transmission route of an optical signal, a bandwidth of the optical signal after narrowing by the wavelength filters;
selecting, from a plurality of combinations of a multi-level modulation system and a baud rate about the optical signal set in a transmitting apparatus, one or more first combinations about which a lower-limit value of the bandwidth of the optical signal for keeping given quality of the optical signal in each of the combinations is equal to or smaller than the bandwidth of the optical signal after narrowing; and
selecting a second combination about which a minimum value of optical signal-to-noise ratio for keeping given quality of the optical signal is smallest from the one or more first combinations.

8. A non-transitory computer-readable storage medium storing a program that causes a processor included in a network design apparatus to execute a process, the process comprising:

- calculating, from a number of wavelength filters on a transmission route of an optical signal, a bandwidth of the optical signal after narrowing by the wavelength filters;
- selecting, from a plurality of combinations of a multi-level modulation system and a baud rate about the optical signal set in a transmitting apparatus, one or more first combinations about which a lower-limit value of the bandwidth of the optical signal for keeping given quality of the optical signal in each of the combinations is equal to or smaller than the bandwidth of the optical signal after narrowing; and
- selecting a second combination about which a minimum value of optical signal-to-noise ratio for keeping given quality of the optical signal is smallest from the one or more first combinations.

* * * * *